United States Patent
Wang et al.

(10) Patent No.: US 11,320,678 B2
(45) Date of Patent: May 3, 2022

(54) PRESSURE SENSOR AND PRESSURE DETECTING METHOD

(71) Applicants: BEIJING BOE OPTOELECTRONICS TECHNOLOGY CO., LTD., Beijing (CN); BOE TECHNOLOGY GROUP CO., LTD, Beijing (CN)

(72) Inventors: Ying Wang, Beijing (CN); Tien Lun Ting, Beijing (CN); Xue Cao, Beijing (CN); Chuncheng Che, Beijing (CN); Hailin Xue, Beijing (CN); Xibin Shao, Beijing (CN); Peizhi Cai, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 688 days.

(21) Appl. No.: 16/329,506

(22) PCT Filed: Jul. 24, 2018

(86) PCT No.: PCT/CN2018/096835
§ 371 (c)(1),
(2) Date: Feb. 28, 2019

(87) PCT Pub. No.: WO2019/047626
PCT Pub. Date: Mar. 14, 2019

(65) Prior Publication Data
US 2021/0341767 A1    Nov. 4, 2021

(30) Foreign Application Priority Data
Sep. 7, 2017    (CN) .......................... 201710801577.6

(51) Int. Cl.
*G02F 1/13* (2006.01)
*G02F 1/1337* (2006.01)
(Continued)

(52) U.S. Cl.
CPC ............ *G02F 1/1309* (2013.01); *G01L 1/247* (2013.01); *G01L 11/02* (2013.01); *G02F 1/13718* (2013.01); *G02F 1/133738* (2021.01)

(58) Field of Classification Search
CPC ............ G02F 1/1309; G02F 1/133738; G02F 1/13718; G01L 1/247; G01L 11/02
See application file for complete search history.

(56) References Cited

U.S. PATENT DOCUMENTS 6,606,540 B1 * 8/2003 Gross .................. B25J 13/082
318/568.11

FOREIGN PATENT DOCUMENTS

| CN | 105445988 A | 3/2016 |
| CN | 105675178 A | 6/2016 |

(Continued)

OTHER PUBLICATIONS

International Search Report and Written Opinion dated Nov. 7, 2018 from State Intellectual Property Office of the P.R. China.

*Primary Examiner* — Donald L Raleigh
(74) *Attorney, Agent, or Firm* — Dilworth & Barrese, LLP.; Michael J. Musella, Esq.

(57) ABSTRACT

A pressure sensor and a pressure detecting method are provided, the pressure sensor includes a liquid crystal cell including a cholesteric liquid crystal layer, a liquid crystal state detector module and a pressure finder module, and the liquid crystal cell includes a pressure receiving surface. The liquid crystal state detector module is configured to detect a liquid crystal arrangement state in the cholesteric liquid crystal layer in a situation where a pressure is applied on the (Continued)

pressure receiving surface of the liquid crystal cell; the pressure finder module is configured to find a value of the pressure corresponding to the liquid crystal arrangement state from a pre-stored correspondence table.

20 Claims, 8 Drawing Sheets

(51) Int. Cl.
    *G01L 1/24*     (2006.01)
    *G01L 11/02*     (2006.01)
    *G02F 1/137*     (2006.01)

(56) References Cited

FOREIGN PATENT DOCUMENTS

| | | |
|---|---|---|
| CN | 107357061 A | 11/2017 |
| JP | 2017101936 A | 6/2017 |
| WO | 2016176508 A1 | 11/2016 |

\* cited by examiner

PRESSURE SENSOR AND PRESSURE DETECTING METHOD

This application claims the benefit of Chinese patent application No. 201710801577.6 filed on Sep. 7, 2017, which is hereby entirely incorporated by reference as a part of the present application.

TECHNICAL FIELD

Embodiments of the present disclosure relate to a pressure sensor and a pressure detecting method.

BACKGROUND

At present, for example, pressure sensors are divided into strain gauge type, piezoresistive type, inductive type, capacitive type, resonant type or thermocouple type or the like according to detection principles, and are formed mainly by mechanical structures or micro-electro-mechanical system structures. Mechanical manufacturing processes and micro-electro-mechanical system processes are complicated, are expensive in process equipment used in back-end processes, and are high in requirements on process precision, which results in low productivity, poor quality and high production cost. In addition, current pressure sensors have low integration and limited service life.

SUMMARY

According to embodiments of the present disclosure, a pressure sensor is provided. The pressure sensor comprises: a liquid crystal cell comprising a cholesteric liquid crystal layer, a liquid crystal state detector module and a pressure finder module. The liquid crystal cell comprises a pressure receiving surface; the liquid crystal state detector module is configured to detect a liquid crystal arrangement state in the cholesteric liquid crystal layer in a situation where a pressure is applied on the pressure receiving surface of the liquid crystal cell; and the pressure finder module is configured to find a value of the pressure corresponding to the liquid crystal arrangement state from a pre-stored correspondence table.

For example, the liquid crystal state detector module comprises a light transmittance detector unit; the light transmittance detector unit is configured to detect a light transmittance of the cholesteric liquid crystal layer, and the light transmittance that is detected represents the liquid crystal arrangement state in the cholesteric liquid crystal layer; the pressure finder module comprises a first finder unit; the first finder unit is configured to find the pressure corresponding to the light transmittance from a first correspondence table, and the first correspondence table stores different light transmittances and pressure values corresponding to the light transmittances.

For example, the light transmittance detector unit comprises a first light source, a first light intensity detector subunit and a light transmittance calculator subunit; the first light source is at a side of the liquid crystal cell and is configured to emit light having a predetermined light-intensity to the liquid crystal cell; the first light intensity detector subunit is at a side of the cholesteric liquid crystal layer facing away from the first light source, and the first light intensity detector subunit is configured to detect a transmitted-light intensity at the side of the cholesteric liquid crystal layer facing away from the first light source; the light transmittance calculator subunit is configured to calculate the light transmittance of the cholesteric liquid crystal layer according to the transmitted-light intensity and the predetermined light-intensity, and the light transmittance of the cholesteric liquid crystal layer is equal to a ratio of the transmitted-light intensity to the predetermined light-intensity.

For example, the first light intensity detector subunit comprises a first photoelectric conversion layer and a first data processor; the first photoelectric conversion layer is coupled to the liquid crystal cell and is configured to generate an electrical signal according to light transmitted to the side of the cholesteric liquid crystal layer facing away from the first light source, and to output the electrical signal to the first data processor; the first data processor is connected with the first photoelectric conversion layer and is configured to process the electrical signal output by the first photoelectric conversion layer to obtain the transmitted-light intensity corresponding to the electrical signal.

For example, the liquid crystal state detector unit comprises a first light intensity detector subunit, a second light intensity detector subunit and a light transmittance calculator subunit; the second light intensity detector subunit is at a side of the cholesteric liquid crystal layer facing an ambient light source, and the second light intensity detector subunit is configured to detect an incident-light intensity at the side of the cholesteric liquid crystal layer facing the ambient light source; the first light intensity detector subunit is at a side of the cholesteric liquid crystal layer facing away from the second light intensity detector submit, and the first light intensity detector subunit is configured to detect a transmitted-light intensity at the side of the cholesteric liquid crystal layer facing away from the second light intensity detector submit; the light transmittance calculator subunit is configured to calculate the light transmittance of the cholesteric liquid crystal layer according to the transmitted-light intensity and the incident-light intensity, and the light transmittance of the cholesteric liquid crystal layer is equal to a ratio of the transmitted-light intensity to the incident-light intensity.

For example, the first light intensity detector subunit comprises a first photoelectric conversion layer and a first data processor; the first photoelectric conversion layer is coupled to the liquid crystal cell and is configured to generate an electrical signal according to light transmitted to the side of the cholesteric liquid crystal layer facing away from the ambient source, and to output the electrical signal to the first data processor; the first data processor is connected with the first photoelectric conversion layer and is configured to process the electrical signal output by the first photoelectric conversion layer to obtain the transmitted-light intensity corresponding to the electrical signal; the second light intensity detector subunit comprises a second photoelectric conversion layer and a second data processor; the second photoelectric conversion layer is coupled to the liquid crystal cell and is configured to generate another electrical signal according to light incident at the side of the cholesteric liquid crystal layer facing the ambient source, and to output the another electrical signal to the second data processor; the second data processor is connected with the second photoelectric conversion layer and is configured to process the another electrical signal output by the second photoelectric conversion layer to obtain the incident-light intensity corresponding to the another electrical signal.

For example, the liquid crystal state detector module comprises a spectrum detector unit; the spectrum detector unit is configured to detect a spectrum of light reflected by the cholesteric liquid crystal layer, and the spectrum that is detected represents the liquid crystal arrangement state in the cholesteric liquid crystal layer; the pressure finder module comprises a second finder unit; the second finder unit is configured to find the pressure corresponding to the spectrum from a second correspondence table, and the second correspondence table stores different spectrums and pressure values corresponding to the spectrums.

For example, the spectrum detector unit comprises a spectrum detector; the spectrum detector is at a side of the liquid crystal cell and is configured to detect the spectrum of reflected light formed by natural light that is reflected by the cholesteric liquid crystal layer.

For example, the liquid crystal cell comprises a first substrate and a second substrate which are opposite to each other, the cholesteric liquid crystal layer is between the first substrate and the second substrate, a horizontally-oriented alignment layer is between the cholesteric liquid crystal layer and the first substrate, and another horizontally-oriented alignment layer is between the cholesteric liquid crystal layer and the second substrate; one of the first substrate and the second substrate is provided with a reference electrode, the other one of the first substrate and the second substrate is provided with a driving electrode, and the reference electrode is configured to be loaded with a constant reference voltage; the liquid crystal state detector module comprises a first driving voltage output unit, a first liquid crystal state determiner unit and a first output controller unit; the first driving voltage output unit is connected with the driving electrode and configured to output a first driving voltage to the driving electrode, and a value of the first driving voltage is configured to increase gradually from a value of the reference voltage; the first liquid crystal state determiner unit is configured to determine whether liquid crystal in the cholesteric liquid crystal layer is in a homeotropic texture state; the first output controller unit is configured to record the first driving voltage that is output by the first driving voltage output unit upon the first liquid crystal determiner unit determines that the liquid crystal in the cholesteric liquid crystal layer is in the homeotropic texture state, and then to control the first driving voltage output unit to output the reference voltage; the pressure finder module comprises a third finder unit; the third finder unit is configured to find the pressure corresponding to the first driving voltage recorded by the first output controller unit from a third correspondence table, and the third correspondence table stores different first driving voltages and pressure values corresponding to the first driving voltages.

For example, the first liquid crystal state determiner unit comprises a first light source, a first light intensity detector subunit and a light transmittance calculator subunit; the first light source is at a side of the liquid crystal cell and is configured to emit light having a predetermined light-intensity to the liquid crystal cell; the first light intensity detector subunit is at a side of the cholesteric liquid crystal layer facing away from the first light source, and is configured to detect a transmitted-light intensity at the side of the cholesteric liquid crystal layer facing away from the first light source; the first light intensity detector subunit comprises a first photoelectric conversion layer and a first data processor; the first photoelectric conversion layer is coupled to the liquid crystal cell and is configured to generate an electrical signal according to light transmitted to the side of the cholesteric liquid crystal layer facing away from the first light source, and to output the electrical signal to the first data processor; the first data processor is connected with the first photoelectric conversion layer and is configured to process the electrical signal output by the first photoelectric conversion layer to obtain the transmitted-light intensity corresponding to the electrical signal; the light transmittance calculator subunit is configured to calculate a light transmittance of the cholesteric liquid crystal layer according to the transmitted-light intensity and the predetermined light-intensity, and the light transmittance of the cholesteric liquid crystal layer is equal to a ratio of the transmitted-light intensity to the predetermined light-intensity; the first liquid crystal state determiner unit determines whether the liquid crystal in the cholesteric liquid crystal layer is in the homeotropic texture state according to the light transmittance.

For example, the first liquid crystal state determiner unit comprises a first light intensity detector subunit, a second light intensity detector subunit and a light transmittance calculator subunit; the second light intensity detector subunit is at a side of the cholesteric liquid crystal layer facing an ambient light source, and is configured to detect an incident-light intensity at the side of the cholesteric liquid crystal layer facing the ambient light source; the second light intensity detector subunit comprises a second photoelectric conversion layer and a second data processor; the second photoelectric conversion layer is coupled to the liquid crystal cell and is configured to generate another electrical signal according to light incident at the side of the cholesteric liquid crystal layer facing the ambient source, and to output the another electrical signal to the second data processor; the second data processor is connected with the second photoelectric conversion layer and is configured to process the another electrical signal output by the second photoelectric conversion layer to obtain the incident-light intensity corresponding to the another electrical signal; the first light intensity detector subunit is at a side of the cholesteric liquid crystal layer facing away from the second light intensity detector submit, and is configured to detect a transmitted-light intensity at the side of the cholesteric liquid crystal layer facing away from the second light intensity detector submit; the first light intensity detector subunit comprises a first photoelectric conversion layer and a first data processor; the first photoelectric conversion layer is coupled to the liquid crystal cell and is configured to generate an electrical signal according to light transmitted to the side of the cholesteric liquid crystal layer facing away from the ambient source, and to output the electrical signal to the first data processor; the first data processor is connected with the first photoelectric conversion layer and is configured to process the electrical signal output by the first photoelectric conversion layer to obtain the transmitted-light intensity corresponding to the electrical signal; the light transmittance calculator subunit is configured to calculate a light transmittance of the cholesteric liquid crystal layer according to the transmitted-light intensity and the incident-light intensity, and the light transmittance of the cholesteric liquid crystal layer is equal to a ratio of the transmitted-light intensity to the incident-light intensity; the first liquid crystal state determiner unit determines whether the liquid crystal in the cholesteric liquid crystal layer is in the homeotropic texture state according to the light transmittance.

For example, the first liquid crystal state determiner unit comprises a spectrum detector unit; the spectrum detector unit is configured to detect a spectrum of light reflected by the cholesteric liquid crystal layer; the spectrum detector unit comprises a spectrum detector; the spectrum detector is at a side of the liquid crystal cell and is configured to detect the spectrum of reflected light formed by natural light that is reflected by the cholesteric liquid crystal layer; the first liquid crystal state determiner unit determines whether the liquid crystal in the cholesteric liquid crystal layer is in the homeotropic texture state according to the spectrum.

For example, the liquid crystal cell comprises a first substrate and a second substrate which are opposite to each other, the cholesteric liquid crystal layer is between the first substrate and the second substrate, a horizontally-oriented alignment layer is between the cholesteric liquid crystal layer and the first substrate, and another horizontally-oriented alignment layer is between the cholesteric liquid crystal layer and the second substrate; one of the first substrate and the second substrate is provided with a reference electrode and a driving electrode, and the reference electrode is configured to be loaded with a constant reference voltage; the liquid crystal state detector module comprises a second driving voltage output unit, a second liquid crystal state determiner unit and a second output controller unit; the second driving voltage output unit is connected with the driving electrode and configured to output a second driving voltage to the driving electrode, and a value of the second driving voltage is configured to increase gradually from a value of the reference voltage; the second liquid crystal state determiner unit is configured to determine whether liquid crystal in the cholesteric liquid crystal layer is in a planar texture state; the second output controller unit is configured to record the second driving voltage that is output by the second driving voltage output unit upon the second liquid crystal determiner unit determines that the liquid crystal in the cholesteric liquid crystal layer is in the planar texture state, and then to control the second driving voltage output unit to output the reference voltage; the pressure finder module comprises a fourth finder unit; the fourth finder unit is configured to find the pressure corresponding to the second driving voltage recorded by the second output controller unit from a fourth correspondence table, and the fourth correspondence table stores different second driving voltages and pressure values corresponding to the second driving voltages.

For example, the second liquid crystal state determiner unit comprises a first light source, a first light intensity detector subunit and a light transmittance calculator subunit; the first light source is at a side of the liquid crystal cell and is configured to emit light having a predetermined light-intensity to the liquid crystal cell; the first light intensity detector subunit is at a side of the cholesteric liquid crystal layer facing away from the first light source, and is configured to detect a transmitted-light intensity at the side of the cholesteric liquid crystal layer facing away from the first light source; the first light intensity detector subunit comprises a first photoelectric conversion layer and a first data processor; the first photoelectric conversion layer is coupled to the liquid crystal cell and is configured to generate an electrical signal according to light transmitted to the side of the cholesteric liquid crystal layer facing away from the first light source, and to output the electrical signal to the first data processor; the first data processor is connected with the first photoelectric conversion layer and is configured to process the electrical signal output by the first photoelectric conversion layer to obtain the transmitted-light intensity corresponding to the electrical signal; the light transmittance calculator subunit is configured to calculate a light transmittance of the cholesteric liquid crystal layer according to the transmitted-light intensity and the predetermined light-intensity, and the light transmittance of the cholesteric liquid crystal layer is equal to a ratio of the transmitted-light intensity to the predetermined light-intensity; the second liquid crystal state determiner unit determines whether the liquid crystal in the cholesteric liquid crystal layer is in the planar texture state according to the light transmittance.

For example, the second liquid crystal state determiner unit comprises a first light intensity detector subunit, a second light intensity detector subunit and a light transmittance calculator subunit; the second light intensity detector subunit is at a side of the cholesteric liquid crystal layer facing an ambient light source, and is configured to detect an incident-light intensity at the side of the cholesteric liquid crystal layer facing the ambient light source; the second light intensity detector subunit comprises a second photoelectric conversion layer and a second data processor; the second photoelectric conversion layer is coupled to the liquid crystal cell and is configured to generate another electrical signal according to light incident at the side of the cholesteric liquid crystal layer facing the ambient source, and to output the another electrical signal to the second data processor; the second data processor is connected with the second photoelectric conversion layer and is configured to process the another electrical signal output by the second photoelectric conversion layer to obtain the incident-light intensity corresponding to the another electrical signal; the first light intensity detector subunit is at a side of the cholesteric liquid crystal layer facing away from the second light intensity detector submit, and is configured to detect a transmitted-light intensity at the side of the cholesteric liquid crystal layer facing away from the second light intensity detector submit; the first light intensity detector subunit comprises a first photoelectric conversion layer and a first data processor subunit; the first photoelectric conversion layer is coupled to the liquid crystal cell and is configured to generate an electrical signal according to light transmitted to the side of the cholesteric liquid crystal layer facing away from the ambient source, and to output the electrical signal to the first data processor; the first data processor is connected with the first photoelectric conversion layer and is configured to process the electrical signal output by the first photoelectric conversion layer to obtain the transmitted-light intensity corresponding to the another electrical signal; the light transmittance calculator subunit is configured to calculate a light transmittance of the cholesteric liquid crystal layer according to the transmitted-light intensity and the incident-light intensity, and the light transmittance of the cholesteric liquid crystal layer is equal to a ratio of the transmitted-light intensity to the incident-light intensity; the second liquid crystal state determiner unit determines whether the liquid crystal in the cholesteric liquid crystal layer is in the planar texture state according to the light transmittance.

For example, the second liquid crystal state determiner unit comprises a spectrum detector unit; the spectrum detector unit is configured to detect a spectrum of light reflected by the cholesteric liquid crystal layer; the spectrum detector unit comprises a spectrum detector; the spectrum detector is at a side of the liquid crystal cell and is configured to detect the spectrum of reflected light formed by natural light that is reflected by the cholesteric liquid crystal layer; the second liquid crystal state determiner unit determines whether the liquid crystal in the cholesteric liquid crystal layer is in the planar texture state according to the spectrum.

According to the embodiments of the disclosure, a pressure detecting method is provided. The pressure detecting method is based on a pressure sensor, the pressure sensor comprises a liquid crystal cell comprising a cholesteric liquid crystal layer, a liquid crystal state detector module and a pressure finder module, and the liquid crystal cell comprises a pressure receiving surface. The pressure detecting method comprises: by the liquid crystal state detector module, detecting a liquid crystal arrangement state in the cholesteric liquid crystal layer; by the pressure finder module, finding a value of a pressure corresponding to the liquid crystal arrangement state from a pre-stored correspondence table.

For example, the liquid crystal state detector module comprises a light transmittance detector unit, and the pressure finder module comprises a first finder unit; the detecting the liquid crystal arrangement state in the cholesteric liquid crystal layer comprises: by the light transmittance detector unit, detecting a light transmittance of the cholesteric liquid crystal layer, wherein the light transmittance that is detected represents the liquid crystal arrangement state in the cholesteric liquid crystal layer; the finding the value of the pressure corresponding to the liquid crystal arrangement state comprises: by the first finder unit, finding the pressure corresponding to the light transmittance from a first correspondence table, wherein the first correspondence table stores different light transmittances and pressure values corresponding to the light transmittances.

For example, the liquid crystal state detector module comprises a spectrum detector unit, and the pressure finder module comprises a second finder unit; the detecting the liquid crystal arrangement state in the cholesteric liquid crystal layer comprises: by the spectrum detector unit, detecting a spectrum of light reflected by the cholesteric liquid crystal layer, wherein the spectrum that is detected represents the liquid crystal arrangement state in the cholesteric liquid crystal layer; the finding the value of the pressure corresponding to the liquid crystal arrangement state comprises: using the second finder unit to find the pressure corresponding to the spectrum from a second correspondence table, wherein the second correspondence table stores different spectrums and pressure values corresponding to the spectrums.

For example, the liquid crystal cell comprises a first substrate and a second substrate which are opposite to each other, the cholesteric liquid crystal layer is between the first substrate and the second substrate, a horizontally-oriented alignment layer is between the cholesteric liquid crystal layer and the first substrate, and another horizontally-oriented alignment layer is between the cholesteric liquid crystal layer and the second substrate; one of the first substrate and the second substrate is provided with a reference electrode, the other one of the first substrate and the second substrate is provided with a driving electrode, and the reference electrode is loaded with a constant reference voltage; the liquid crystal state detector module comprises a first driving voltage output unit, a first liquid crystal state determiner unit and a first output controller unit, the first driving voltage output unit is connected with the driving electrode, the first output controller unit is connected with the first driving voltage output unit and the first liquid crystal state determiner unit; the pressure finder module comprises a third finder unit. The detecting the liquid crystal arrangement state in the cholesteric liquid crystal layer comprises: by the first driving voltage output unit, outputting a first driving voltage to the driving electrode, wherein a value of the first driving voltage gradually increases from a value of the reference voltage; by the first liquid crystal state determiner unit, determining whether the liquid crystal in the cholesteric liquid crystal layer is in a homeotropic texture state; upon the first liquid crystal determiner unit determines that the liquid crystal in the cholesteric liquid crystal layer is in the homeotropic texture state, by the first output controller unit, recording the first driving voltage that is output by the first driving voltage output unit, and then controlling the first driving voltage output unit to output the reference voltage; the finding the value of the pressure corresponding to the liquid crystal arrangement state comprises: by the third finder unit, finding the pressure corresponding to the first driving voltage recorded by the first output controller unit from a third correspondence table, wherein the third correspondence table stores different first driving voltages and pressure values corresponding to the first driving voltages.

For example, the liquid crystal cell comprises a first substrate and a second substrate which are opposite to each other, the cholesteric liquid crystal layer is between the first substrate and the second substrate, a horizontally-oriented alignment layer is between the cholesteric liquid crystal layer and the first substrate, and another horizontally-oriented alignment layer is between the cholesteric liquid crystal layer and the second substrate; one of the first substrate and the second substrate is provided with a reference electrode and a driving electrode, and the reference electrode is loaded with a constant reference voltage; the liquid crystal state detector module comprises a second driving voltage output unit, a second liquid crystal state determiner unit and a second output controller unit, the second driving voltage output unit is connected with the driving electrode, the second output controller unit is connected with the second driving voltage output unit and the second liquid crystal state determiner unit; the pressure finder module comprises a fourth finder unit. The detecting the liquid crystal arrangement state in the cholesteric liquid crystal layer comprises: by the second driving voltage output unit, outputting a second driving voltage to the driving electrode, wherein a value of the second driving voltage gradually increases from a value of the reference voltage; by the second liquid crystal state determiner unit, determining whether the liquid crystal in the cholesteric liquid crystal layer is in a planar texture state; upon the second liquid crystal determiner unit determines that the liquid crystal in the cholesteric liquid crystal layer is in the planar texture state, by the second output controller unit, recording the second driving voltage that is output by the second driving voltage output unit, and then controlling the second driving voltage output unit to output the reference voltage; the finding the value of the pressure corresponding to the liquid crystal arrangement state comprises: by the fourth finder unit, finding the pressure corresponding to the second driving voltage recorded by the second output controller unit from a fourth correspondence table, wherein the fourth correspondence table stores different second driving voltages and pressure values corresponding to the second driving voltages.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

Embodiments of the present disclosure provide a pressure sensor, the pressure sensor includes a liquid crystal cell including a cholesteric liquid crystal layer, a liquid crystal state detector module and a pressure finder module, in which the liquid crystal cell includes a pressure receiving surface; the liquid crystal state detector module is configured to detect a liquid crystal arrangement state in the cholesteric liquid crystal layer in a situation where a pressure is applied on the pressure receiving surface of the liquid crystal cell; the pressure finder module is configured to find a value of a pressure corresponding to the liquid crystal arrangement state from a pre-stored correspondence table. FIG. 1D is a structural block diagram of the pressure sensor provided by the embodiments of the present disclosure. For example, the liquid crystal state detector module and the pressure finder module are implemented by using hardware, or firmware, or a combination of hardware and software, or a combination of firmware and software.

In the embodiments according to the present disclosure, the type of the pressure applied to the pressure receiving surface of the liquid crystal cell is not limited. For example, the pressure is a finger pressing pressure, a touch pen pressing pressure, a gas pressure, a hydraulic pressure, or the like. Accordingly, in the embodiments according to the present disclosure, the type of a pressure-applying object that applies the pressure to the pressure receiving surface of the liquid crystal cell is not limited. For example, the pressure-applying object is a finger, a touch pen, a gas, a liquid, or the like.

Figure 1A:
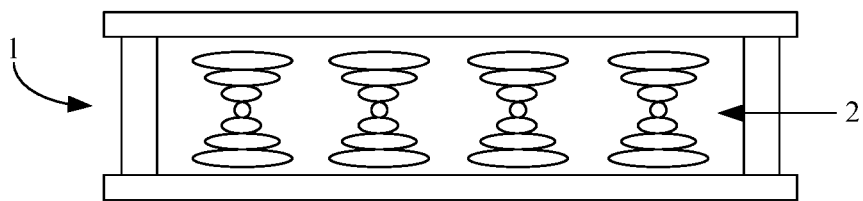
FIG. 1A to FIG. 1C are schematic views showing that cholesteric liquid crystals in a planar texture state, a focal conic texture state and a homeotropic texture state.
Figure 1B:
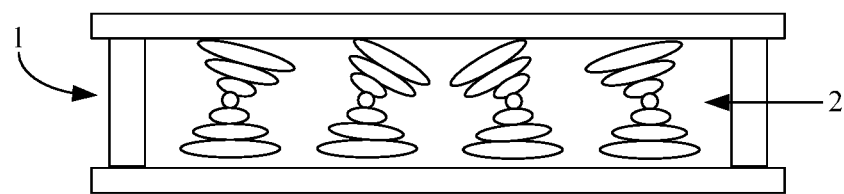
Figure 1C:
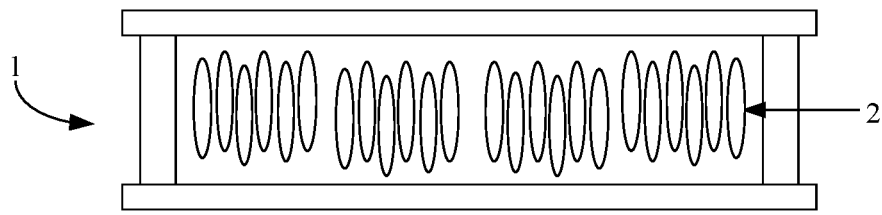
Figure 1D:
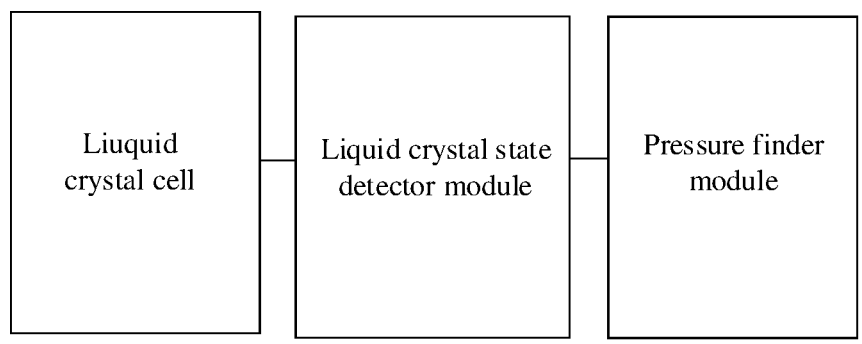
FIG. 1D is a structural block diagram of a pressure sensor according to embodiments of the present disclosure.

FIG. 1A to FIG. 1C are schematic views showing cholesteric liquid crystals in a planar texture state, a focal conic texture state and a homeotropic texture state, respectively. As shown in FIG. 1A to FIG. 1C, the cholesteric liquid crystal layer has three different molecular arrangement structures: the planar texture state (abbreviated as P state), the focal conic texture state (abbreviated as FC state), and the homeotropic texture state (abbreviated as H-state).

Referring to FIG. 1A, in a situation where the cholesteric liquid crystal layer is in the P state, the liquid crystal in the cholesteric liquid crystal layer 2 has periodic spiral structures, and spiral axes of the respective spiral structures are perpendicular to a substrate of the liquid crystal cell 1. Referring to FIG. 1B, in a situation where the cholesteric liquid crystal layer is in the FC state, the liquid crystal in the cholesteric liquid crystal layer 2 exhibits a multi-domain structure, the spiral structure still exists in each liquid crystal domain, spiral pitches in respective spiral structures are changed, and spiral axes of the spiral structures exhibit irregular tilts. Referring to FIG. 1C, in a situation where the cholesteric liquid crystal layer is in the FC state, the spiral structures in the cholesteric liquid crystal layer 2 are disassembled, and long axes of liquid crystal molecules are perpendicular to the substrate of the liquid crystal cell 1.

In the embodiments of the present disclosure, without considering an action of an electric field, in a situation where the pressure receiving surface of the liquid crystal cell 1 is not applied with the pressure, the cholesteric liquid crystal layer 2 in the liquid crystal cell 1 is in the P state; in a situation where the pressure is applied to the pressure receiving surface of the liquid crystal cell 1, the cholesteric liquid crystal layer 2 in the liquid crystal cell 1 is changed from the P state to the FC state, and the cholesteric liquid crystal layer 2 in the FC state has different liquid crystal arrangement states therein according to different pressures; That is, after the cholesteric liquid crystal layer 2 is applied with the pressure, a corresponding liquid crystal arrangement state is exhibited. For example, the greater the pressure is, the more irregular the liquid crystal arrangement in the cholesteric liquid crystal layer 2 is.

Based on the above principle, in the embodiments of the present disclosure, for example, through experiments performed in advance, the liquid crystal arrangement states exhibited by the cholesteric liquid crystal layer 2 under different pressures are collected, and thus the correspondence table is established. In an actual pressure detecting process, for example, the liquid crystal state detector module is used to detect the liquid crystal arrangement state in the cholesteric liquid crystal layer 2 in a situation where the pressure receiving surface of the liquid crystal cell 1 is under the pressure, and then the pressure finder module looks up the correspondence table to determine the value of the pressure corresponding to the liquid crystal arrangement state in the cholesteric liquid crystal layer 2.

The pressure sensor provided by the embodiments of the present disclosure is based on the liquid crystal cell 1 including the cholesteric liquid crystal layer 2, the manufacturing process of the liquid crystal cell 1 is a standard semiconductor process and is particularly compatible with the TFT-LCD production line process, and thus the manufacturing process of the liquid crystal cell 1 has characteristics such as standardization, good process quality and high productivity. In addition, the pressure sensor has a wide application range and is applicable for detecting large-scale and high-precision pressure changes; the pressure sensor is not only suitable for pressure measurement in general environments, but also for pressure detection in harsh environments, such as high humidity environments, corrosive gas or liquid environments, salt and alkaline environments or flammable and explosive gas environments, etc.; the pressure sensor is also applicable for high pressure and high range measurements.

Figure 2:
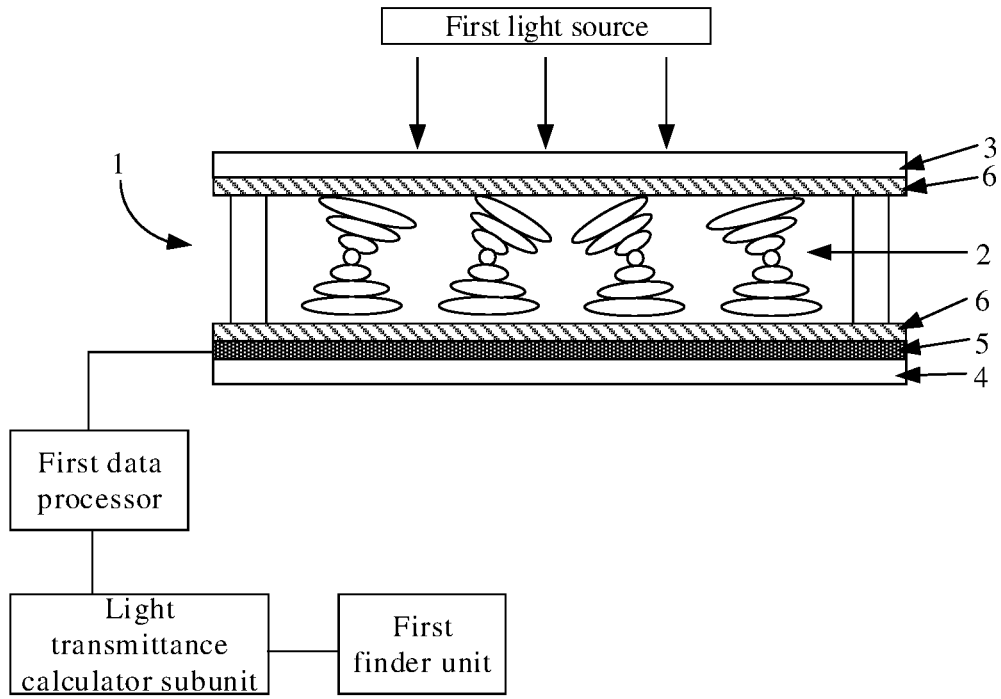
FIG. 2 is a schematic structural diagram of the pressure sensor according to the embodiments of the present disclosure.
Figure 12:
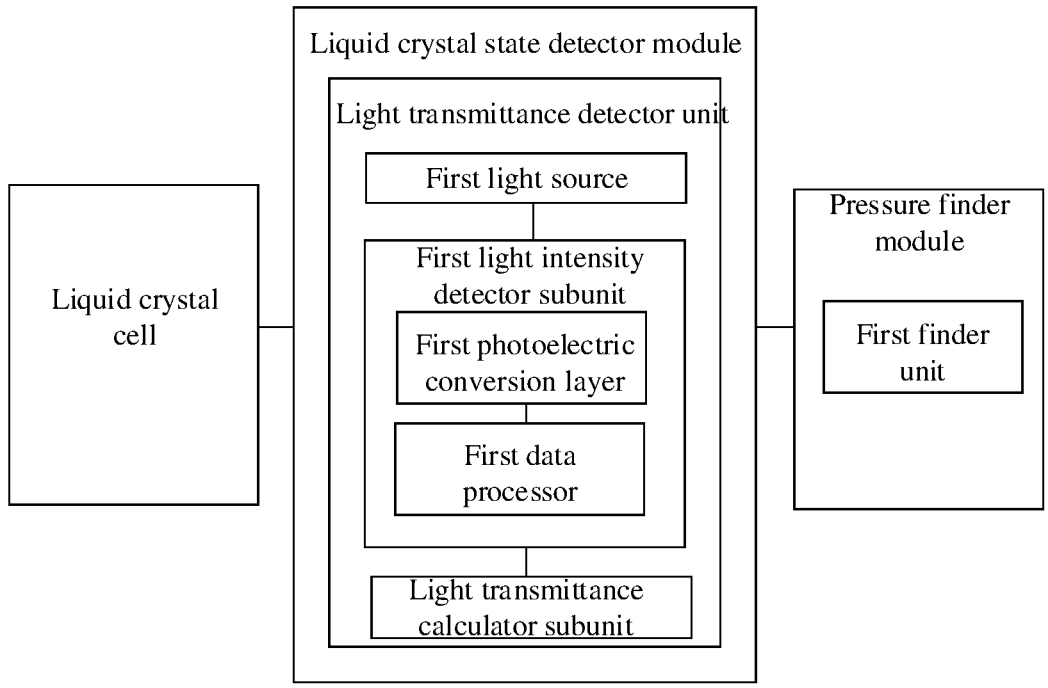
FIG. 12 is a block diagram showing a structure of the pressure sensor shown in FIG. 2.

FIG. 2 is a schematic structural diagram of the pressure sensor according to the embodiments of the present disclosure. The pressure sensor shown in FIG. 2 is a specific solution of the pressure sensor as described above. FIG. 12 is a block diagram showing a structure of the pressure sensor shown in FIG. 2. For example, the liquid crystal state detector module includes a light transmittance detector unit, and the pressure finder module includes a first finder unit.

For example, the light transmittance detector unit is configured for detecting a light transmittance of the cholesteric liquid crystal layer 2 and taking the light transmittance that is detected as a representation of the liquid crystal arrangement state in the cholesteric liquid crystal layer 2.

The first finder unit is configured to find the pressure corresponding to the light transmittance from a first correspondence table, and the first correspondence table stores different light transmittances and pressure values corresponding to the light transmittances. For example, the first finder unit is a first finder circuit.

In the embodiments of the present disclosure, without considering the action of the electric field, in a situation where no pressure is applied to the pressure receiving surface of the liquid crystal cell 1, the cholesteric liquid crystal layer 2 in the liquid crystal cell 1 is in the P state, incident light that is incident on the cholesteric liquid crystal layer 2 is strongly reflected, reflected light is circularly polarized light, and the cholesteric liquid crystal layer 2 exhibits a bright state. In this case, light which passes through the cholesteric liquid crystal layer 2 is less, and the light transmittance of the cholesteric liquid crystal layer 2 is the smallest.

In the situation where the pressure is applied to the pressure receiving surface of the liquid crystal cell 1, the cholesteric liquid crystal layer 2 is changed from the P state to the FC state, in this case, the distribution of the spiral axes is disordered, and the light incident into the cholesteric liquid crystal layer 2 is scattered due to the mismatch between refractive indexes of liquid crystal domains. The liquid crystal in the FC state exhibits a multi-domain structure in which the spiral structure still exists in each liquid crystal domain, but the periodically repeating spiral structures do not exist. The light incident into the cholesteric liquid crystal layer 2 is scattered due to the mismatch between the refractive indexes of the liquid crystal domains, and in this case, the liquid crystal cell 1 exhibits a fog state or a dark state. Compared with the P state, the wavelength range of the light that the cholesteric liquid crystal layer 2 in the FC state reflect reduces, and the light transmittance of the cholesteric liquid crystal layer 2 increases.

It should be noted that, according to different pressures, the cholesteric liquid crystal layer 2 in the FC state has different liquid crystal arrangement states therein, and thus has different light transmittances. That is, after the pressure is applied on the cholesteric liquid crystal layer 2, the cholesteric liquid crystal layer 2 exhibits the corresponding liquid crystal arrangement state, and thus has the corresponding light transmittance (the pressure, the liquid crystal arrangement state, and the light transmittance have a corresponding relationship with each other).

Based on the above principle, in the embodiments of the present disclosure, the light transmittance of the cholesteric liquid crystal layer 2 serves as the representation of the liquid crystal arrangement state of the cholesteric liquid crystal layer 2. That is, the liquid crystal arrangement state of the cholesteric liquid crystal layer 2 is indicated by the light transmittance of the cholesteric liquid crystal layer 2. For example, through experiments performed in advance, the light transmittances exhibited by the cholesteric liquid crystal layer 2 under different pressures are collected, and the first correspondence table is established. In an actual pressure detecting process, for example, the light transmittance detector module is used to detect the light transmittance of the cholesteric liquid crystal layer 2 in the situation where the pressure is applied on the pressure receiving surface of the liquid crystal cell 1, and then the first finder unit looks up the first correspondence table to determine the value of the pressure.

For example, the light transmittance detector unit includes a first light source, a first light intensity detector subunit and a light transmittance calculator subunit; the first light source is at a side of the liquid crystal cell 1 (taking the first light source at a side, provided with the pressure receiving surface, of the liquid crystal cell 1 as an example), and the first light source is configured to emit light having a predetermined light-intensity to the liquid crystal cell 1; the first light intensity detector subunit is at a side of the cholesteric liquid crystal layer 2 facing away from the first light source, and the first light intensity detector subunit is configured to detect a transmitted-light intensity at the side of the cholesteric liquid crystal layer 2 facing away from the first light source; the light transmittance calculator subunit is configured to calculate the light transmittance of the cholesteric liquid crystal layer 2 according to the transmitted-light intensity and the predetermined light-intensity. For example, the light transmittance of the cholesteric liquid crystal layer 2 is equal to a ratio of the transmitted-light intensity to the predetermined light-intensity, and the predetermined light-intensity is an intensity of the light emitted from the first light source before the light passes through the liquid crystal cell 1. For example, the light transmittance calculator subunit is a light transmittance calculator sub-circuit.

For example, the first light intensity detector subunit includes a first photoelectric conversion layer (the first photoelectric conversion layer comprises a photoelectric conversion material) 5 and a first data processor; the first photoelectric conversion layer 5 is coupled to the liquid crystal cell 1 and is configured to generate an electrical signal according to light transmitted to the side of the cholesteric liquid crystal layer 2 facing away from the first light source, and to output the electrical signal to the first data processor; the first data processor is connected with the first photoelectric conversion layer 5 and is configured to process the electrical signal output by the first photoelectric conversion layer 5 to obtain the transmitted-light intensity. For example, the first data processor is a first data processor circuit.

For example, the liquid crystal cell 1 includes a first substrate 3 and a second substrate 4 which are opposite to each other, the cholesteric liquid crystal layer 2 is between the first substrate 3 and the second substrate 4, a horizontally-oriented alignment layer 6 is between the cholesteric liquid crystal layer 2 and the first substrate 3, and another horizontally-oriented alignment layer 6 is between the cholesteric liquid crystal layer 2 and the second substrate 4. In the embodiments of the present disclosure, exemplary descriptions are given by taking an outer surface of the first substrate 3 serving as the pressure receiving surface as an example. For example, in the embodiments of the present disclosure, an outer surface of the second substrate 4 serves as the pressure receiving surface. For example, for the horizontally-oriented alignment layers 6, their orientation structures (for example, polymer main chains) extend in a horizontal direction.

In the embodiments of the present disclosure, for example, the first light source is located at the side of the first substrate 3 facing away from the cholesteric liquid crystal layer 2, and the first photoelectric conversion layer 5 is located at the side, facing away from the cholesteric liquid crystal layer 2, of the another alignment layer 6 that the second substrate 4 corresponds to. For example, the first photoelectric conversion layer 5 is formed between the second substrate 4 and the another alignment layer 6 that the second substrate 4 corresponds to, or formed in the second substrate 4, or formed at a side of the second substrate 4 facing away from the cholesteric liquid crystal layer 2. Only the case where the first photoelectric conversion layer 5 is formed between the second substrate 4 and the another alignment layer 6 corresponding thereto is shown in the drawing, and for the other two cases as described above, the corresponding drawings are omitted.

It should be noted that in a situation where the cholesteric liquid crystal layer 2 is only subjected to the pressure, it is difficult for the cholesteric liquid crystal layer 2 to exhibit the H state. In practical applications, it is found that the cholesteric liquid crystal layer 2 exhibits the H state only in a situation where a strong vertical electric field is in the liquid crystal cell 1 and the liquid crystal cell 1 is not subjected to the pressure. In this case, all liquid crystal molecules have a trend of uniform alignment along the vertical electric field direction, thus the spiral structures begin to be disassembled and finally change into nematic liquid crystal structures uniformly aligned in the electric field direction, and in this case, the liquid crystal cell 1 exhibits a transparent state. In the situation where the cholesteric liquid crystal layer 2 is in the H state, the wavelength range of the light that the cholesteric liquid crystal layer 2 reflects is the smallest, and the cholesteric liquid crystal layer 2 has the highest light transmittance.

It should be noted that, in the embodiments of the present disclosure, for example, the first light source is located at the side, provided with the pressure receiving surface, of the liquid crystal cell 1 or at a side of the liquid crystal cell facing away from the pressure receiving surface, all of which belong to protection scope of the disclosure.

Figure 3:
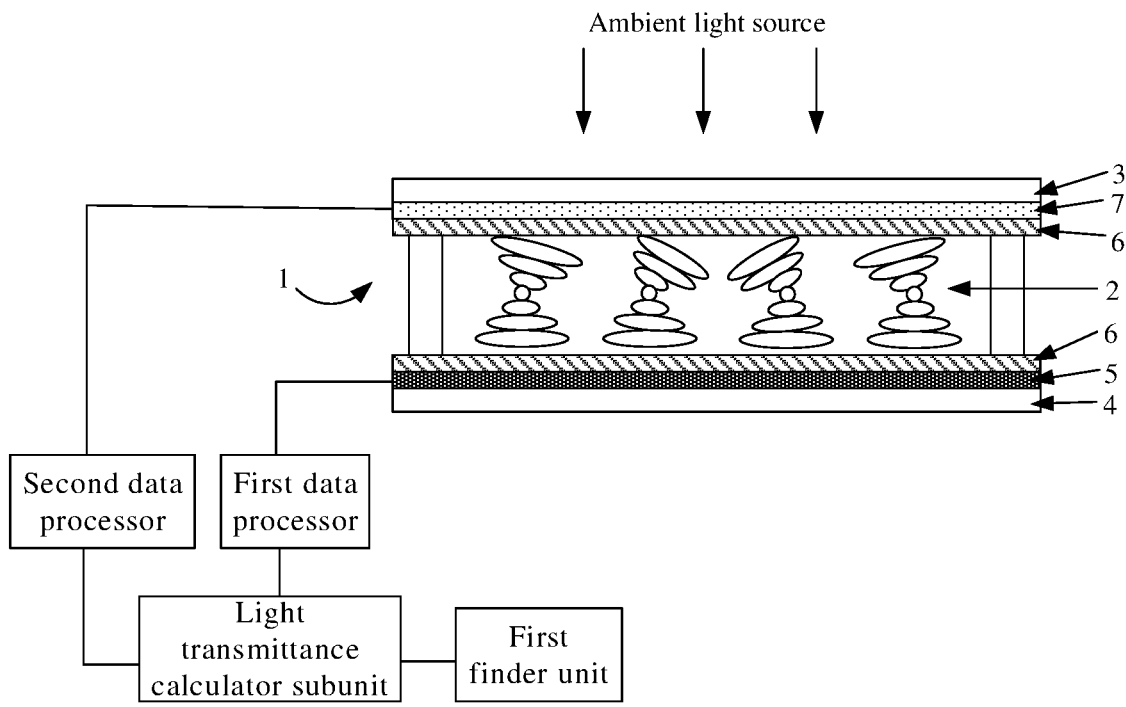
FIG. 3 is another schematic structural diagram of the pressure sensor according to the embodiments of the present disclosure.
Figure 13:
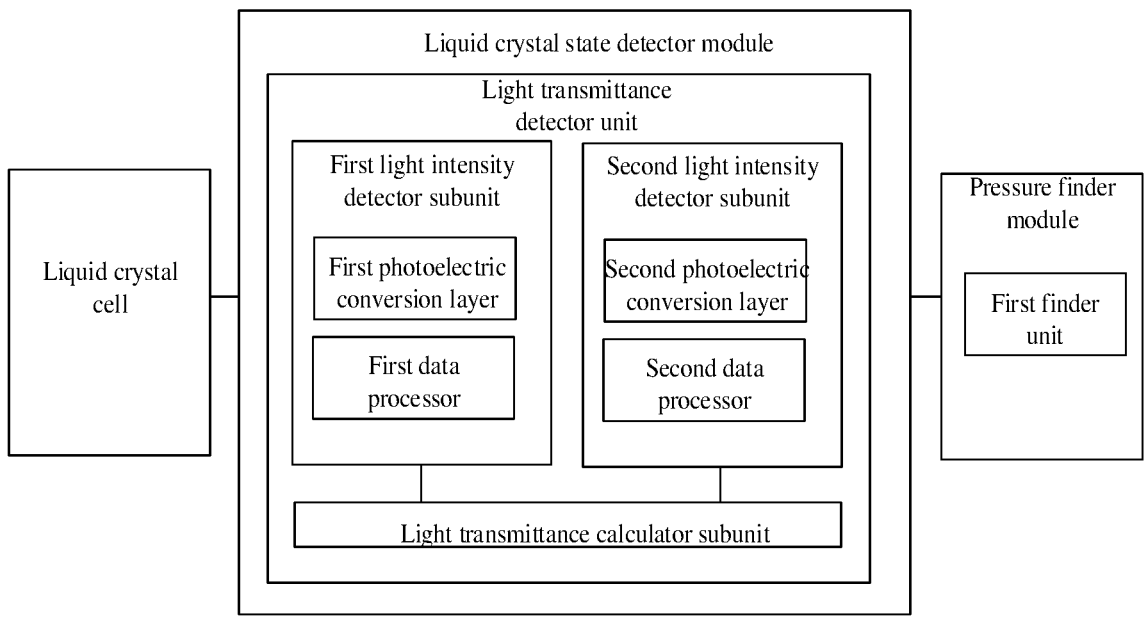
FIG. 13 is a block diagram showing the structure of the pressure sensor shown in FIG. 3.

FIG. 3 is another schematic structural diagram of the pressure sensor according to the embodiments of the present disclosure. FIG. 13 is a block diagram showing the structure of the pressure sensor shown in FIG. 3. As shown in FIG. 3, similarly to the principle of the pressure sensor shown in FIG. 2, for the pressure sensor shown in FIG. 3, the light transmittance of the cholesteric liquid crystal layer 2 also serves as the representation of the liquid crystal arrangement state of the cholesteric liquid crystal layer 2, the light transmittance detector unit detects the light transmittance of the cholesteric liquid crystal layer 2 in the situation where the pressure receiving surface of the liquid crystal cell 1 is under pressure, and then the first finder unit looks up the first correspondence table to determine the value of the pressure. However, unlike the pressure sensor shown in FIG. 2, the light transmittance detector unit in the pressure sensor shown in FIG. 3 includes the first light intensity detector subunit, a second light intensity detector subunit and the light transmittance calculator subunit; the second light intensity detector subunit is at a side of the cholesteric liquid crystal layer 2 facing an ambient light source, and the second light intensity detector subunit is configured to detect an incident-light intensity at the side of the cholesteric liquid crystal layer 2 facing the ambient light source; the first light intensity detector subunit is at a side of the cholesteric liquid crystal layer 2 facing away from the second light intensity detector submit, and the first light intensity detector subunit is configured to detect the transmitted-light intensity at the side of the cholesteric liquid crystal layer 2 facing away from the second light intensity detector submit; the light transmittance calculator subunit is configured to calculate the light transmittance of the cholesteric liquid crystal layer 2 according to the transmitted-light intensity and the incident-light intensity, and the light transmittance of the cholesteric liquid crystal layer 2 is equal to a ratio of the transmitted-light intensity to the incident-light intensity.

Compared with FIG. 2, the pressure sensor shown in FIG. 3 has no requirement for the light intensity of the light incident into the liquid crystal cell 1, that is, the pressure sensor shown in FIG. 3 has no requirement for the ambient light source, and for example, the ambient light source is any light source originally used in the place where the pressure sensor is applied. For example, the ambient light source is natural light. In this case, the natural light sequentially passes through the second light intensity detector subunit, the cholesteric liquid crystal layer 2 and the first light intensity detector subunit, and the second light intensity detector subunit for example detects the light intensity of the natural light incident to the cholesteric liquid crystal layer 2, the first light intensity detector subunit for example detects the light intensity of the natural light transmitted through the cholesteric liquid crystal layer 2, and a division operation is performed on a value of the light intensity detected by the first light intensity detector subunit and a value of the light intensity detected by the second light intensity detector subunit to obtain the light transmittance of the cholesteric liquid crystal layer 2. Finally, by looking up the table, the pressure corresponding to the light transmittance of the cholesteric liquid crystal layer 2 is obtained.

It is seen that the pressure sensor shown in FIG. 3 has no requirement for the light source in performing pressure detection, and has better universality; more importantly, the pressure sensor performs the pressure detection directly based on the ambient light such as the natural light, which simplifies manufacturing processes and simplifies detection operations.

For example, the first light intensity detector subunit includes the first photoelectric conversion layer (the first photoelectric conversion layer comprises the photoelectric conversion material) 5 and the first data processor; the first photoelectric conversion layer 5 is coupled to the liquid crystal cell 1 and is configured to generate the electrical signal according to light transmitted to the side of the cholesteric liquid crystal layer 2 facing away from the ambient light source, and to output the electrical signal to the first data processor; the first data processor is connected with the first photoelectric conversion layer 5 and is configured to process the electrical signal output by the first photoelectric conversion layer 5 to obtain the transmitted-light intensity. For example, the first data processor is the first data processor circuit.

For example, the second light intensity detector subunit includes a second photoelectric conversion layer (the second photoelectric conversion layer comprises the photoelectric conversion material) 7 and a second data processor; the second photoelectric conversion layer 7 is coupled to the liquid crystal cell 1 and is configured to generate another electrical signal according to light incident at the side of the cholesteric liquid crystal layer 2 facing the ambient light source, and to output the another electrical signal to the second data processor; the second data processor is connected with the second photoelectric conversion layer 7 and is configured to process the another electrical signal output by the second photoelectric conversion layer 7 to obtain the incident-light intensity. For example, the second data processor is a second data processor circuit.

For example, it is only necessary to ensure that one of the first photoelectric conversion layer 5 and the second photoelectric conversion layer 7 is located at the side, facing away from the cholesteric liquid crystal layer 2, of the alignment layer 6 that the first substrate 3 corresponds to, and the other of the first photoelectric conversion layer 5 and the second photoelectric conversion layer 7 is located at the side, facing away from the cholesteric liquid crystal layer 2, of the another alignment layer 6 that the second substrate 4 corresponds to.

It should be noted that, in the embodiments of the present disclosure, in order to improve the integration degree of the pressure sensor, the first data processor and the second data processor for example are integrated into a same processor, which is also within the protection scope of the present disclosure.

In addition, in the embodiments of the present disclosure, for example, the light emitted from the ambient light source is incident from the pressure receiving surface of the liquid crystal cell 1 to the cholesteric liquid crystal layer 2, or is incident from the side of the liquid crystal cell 1 facing away from the pressure receiving surface to the cholesteric liquid crystal layer 2, all of which fall within the protection scope of the present disclosure.

Figure 4:
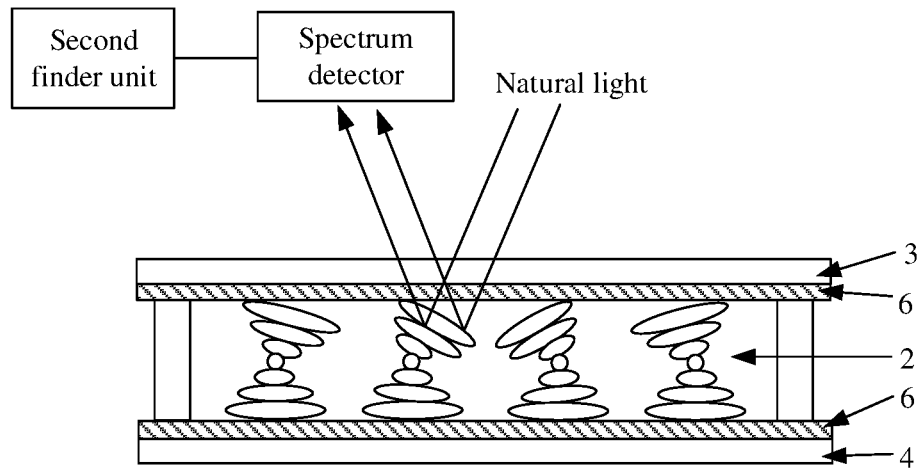
FIG. 4 is still another schematic structural diagram of the pressure sensor according to the embodiments of the present disclosure.
Figure 14:
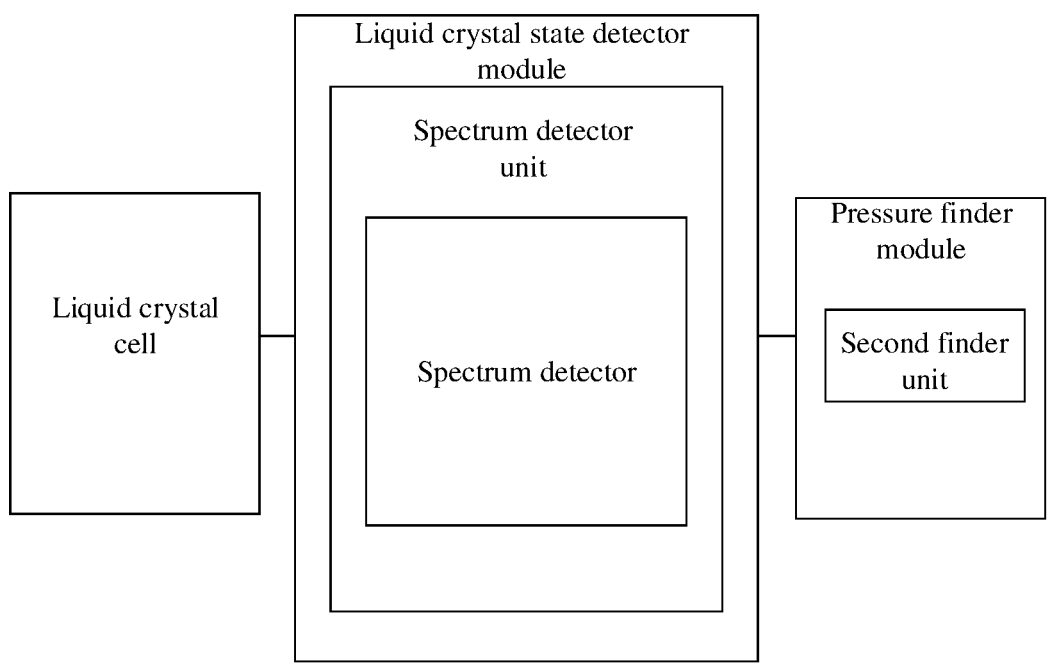
FIG. 14 is a block diagram showing the structure of the pressure sensor shown in FIG. 4.

FIG. 4 is another schematic structural diagram of the pressure sensor according to the embodiments of the present disclosure. FIG. 14 is a block diagram showing the structure of the pressure sensor shown in FIG. 4. As shown in FIG. 4, the liquid crystal state detector module includes a spectrum detector unit, and the pressure finder module includes a second finder unit.

The spectrum detector unit is configured to detect a spectrum of the light reflected by the cholesteric liquid crystal layer 2, and the spectrum that is detected serves as a representation of the liquid crystal arrangement state in the cholesteric liquid crystal layer 2.

The second finder unit is configured to find the pressure corresponding to the spectrum from a second correspondence table, and the second correspondence table stores different spectrums and pressure values corresponding to the spectrums. For example, the second finder unit is a second finder circuit.

Based on the foregoing content, it is seen that, corresponding to different pressures, the cholesteric liquid crystal layer 2 in the FC state has different liquid crystal arrangement states therein, and thus has different light transmittances and reflects light of different wavelength ranges (namely, different spectrums of reflected light). That is, after the pressure is applied on the cholesteric liquid crystal layer 2, the cholesteric liquid crystal layer 2 exhibits the corresponding liquid crystal arrangement state, and has the corresponding wavelength range of reflected light (the pressure, the liquid crystal arrangement state, and the wavelength range of the reflected light have a corresponding relationship).

Based on the above principle, in the embodiments of the present disclosure, the wavelength range of the reflected light reflected by the cholesteric liquid crystal layer 2 serves as a representation of the liquid crystal arrangement state of the cholesteric liquid crystal layer 2. That is, the liquid crystal arrangement state of the cholesteric liquid crystal layer 2 is indicated by the spectrum of the reflected light reflected by the cholesteric liquid crystal layer 2. For example, through experiments performed in advance, the spectrums of the light reflected by the cholesteric liquid crystal layer 2 under different pressures are collected, and the second correspondence table is established. In an actual pressure detecting process, for example, the spectrum detector unit is used to detect the spectrum of the light reflected by the cholesteric liquid crystal layer 2 in the situation where the pressure is applied on the pressure receiving surface of the liquid crystal cell 1, and then the second finder unit looks up the second correspondence table to determine the value of the pressure.

It should be noted that, the wavelength range of the light incident to the cholesteric liquid crystal layer 2 in the pressure detecting process is identical with a wavelength range of light incident to the cholesteric liquid crystal layer 2 in the experiments for establishing the second correspondence table, to ensure the accuracy of the final detecting results. For example, the light incident to the cholesteric liquid crystal layer 2 in the embodiments of the present disclosure is the natural light.

For example, the spectrum detector unit includes a spectrum detector located at a side of the liquid crystal cell 1 and configured for detecting the spectrum of reflected light formed by the natural light reflected by the cholesteric liquid crystal layer 2. In the embodiments of the present disclosure, for example, the spectrum detector is located at the side, provided with the pressure receiving surface, of the liquid crystal cell 1, or is located at the side of the liquid crystal cell 1 facing away from the pressure receiving surface, which are all within the protection scope of the present disclosure.

It should be noted that, in performing pressure detection by using the pressure sensor provided in any one of FIGS. 2 to 4 described above, it is necessary to perform the detection based on an optical path. In order to avoid the influence of the pressure-applying object (such as the finger or the touch pen) on the optical path, for example, a position of the pressure receiving surface where the optical path is not provided is set as a designated pressure-applied region; or after the pressure-applying object presses the pressure receiving surface and then leaves the pressure receiving surface (the cholesteric liquid crystal layer 2 is capable of maintaining the liquid crystal arrangement state that occurs when the cholesteric liquid crystal layer 2 is pressed), the light transmittance of the cholesteric liquid crystal layer 2 or the wavelength range of the light that is reflected by the cholesteric liquid crystal layer 2 is detected based on the optical path.

Figure 5:
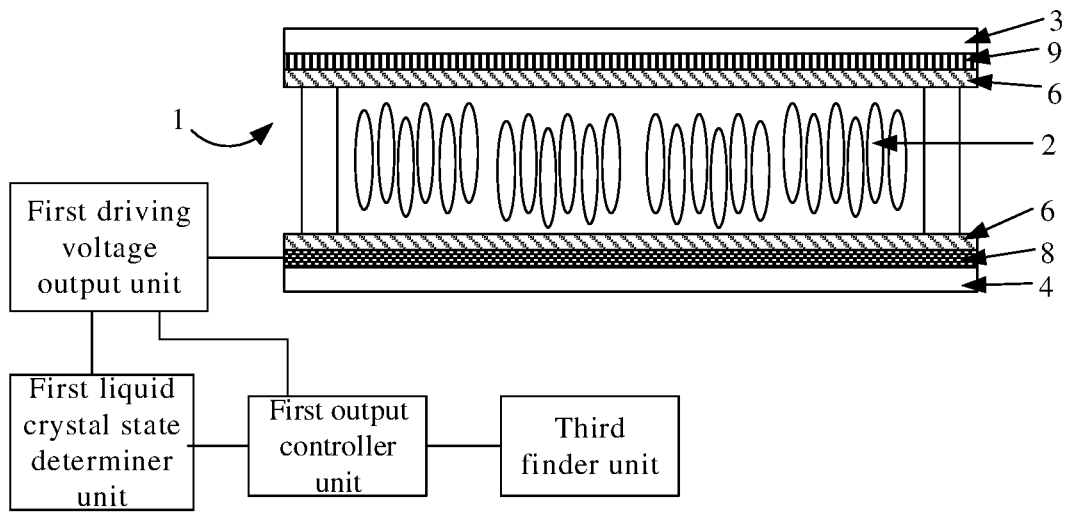
FIG. 5 is still another schematic structural diagram of the pressure sensor according to the embodiments of the present disclosure.

FIG. 5 is another schematic structural diagram of the pressure sensor according to the embodiments of the present disclosure. As shown in FIG. 5, the liquid crystal cell 1 includes the first substrate 3 and the second substrate 4 which are opposite to each other, the cholesteric liquid crystal layer 2 is between the first substrate 3 and the second substrate 4, the horizontally-oriented alignment layer 6 is between the cholesteric liquid crystal layer 2 and the first substrate 3, and the another horizontally-oriented alignment layer 6 is between the cholesteric liquid crystal layer 2 and the second substrate 4; one of the first substrate 3 and the second substrate 4 is provided with a reference electrode 9, the other one of the first substrate 3 and the second substrate 4 is provided with a driving electrode 8, the reference electrode 9 is configured to be loaded with a constant reference voltage, and the reference electrode 9 and the driving electrode 8 form a vertical electric field in the liquid crystal layer 2, for example; the liquid crystal state detector module includes a first driving voltage output unit, a first liquid crystal state determiner unit and a first output controller unit, and the pressure finder module includes a third finder unit.

The first driving voltage output unit is connected with the driving electrode 8 and is configured for outputting a first driving voltage to the driving electrode 8, and a value of the first driving voltage increases gradually from a value of the reference voltage. For example, the first driving voltage output unit is a first driving voltage output circuit.

The first liquid crystal state determiner unit is configured to determine whether the liquid crystal in the cholesteric liquid crystal layer 2 is in the homeotropic texture state.

The first output controller unit is configured to record the first driving voltage that is output by the first driving voltage output unit upon the first liquid crystal determiner unit determines that the liquid crystal in the cholesteric liquid crystal layer is in the homeotropic texture state, and then to control the first driving voltage output unit to output the reference voltage to the driving electrode 8. For example, the first output controller unit is a first output controller circuit.

The third finder unit is configured to find the pressure corresponding to the first driving voltage recorded by the first output controller unit from a third correspondence table, and the third correspondence table stores different first driving voltages and pressure values corresponding to the first driving voltages. For example, the third finder unit is a third finder circuit.

Based on the foregoing description, it is seen that in a situation where the cholesteric liquid crystal layer 2 is under the pressure, the cholesteric liquid crystal layer 2 is changed from the P state to the FC state, and is in the liquid crystal arrangement state corresponding to the value of the pressure. In this case, if the pressure is removed, the liquid crystal arrangement state remains stable under a certain condition (for example, being stable by means of surface treatment or polymer stabilization, etc.) to form a zero field stable state. In a situation where a sufficiently high vertical electric field intensity E which is greater than $E_{c1}$ ($E_{c1}$ is a vertical electric field threshold intensity in a situation where the liquid crystal undergoes a phase transition and finally exhibits the H state) is applied to the liquid crystal cell 1, all liquid crystal molecules are changed to align along a direction of the electric field due to a dielectric anisotropy of liquid crystal material. The vertical electric field threshold intensity $E_{c1}$ in the situation where the liquid crystal undergoes the phase transition and finally exhibits the H state is related to the liquid crystal arrangement state of the cholesteric liquid crystal layer 2, and the two have a corresponding relationship. It is seen that the pressure, the liquid crystal arrangement state and the vertical electric field threshold intensity $E_{c1}$ upon the H state occurs have a corresponding relationship with each other.

In addition, an intensity of the vertical electric field is proportional to a voltage difference between the voltage applied to the driving electrode 8 (which is always greater than the reference voltage) and the voltage applied to the reference electrode 9, the intensity of the vertical electric field is positively correlated with the first driving voltage applied to the driving electrode 8 in a situation where the reference voltage is constant. Therefore, the pressure, the liquid crystal arrangement state, and a threshold value of the first driving voltage that is applied to the driving electrode 8 to control the cholesteric liquid crystal layer 2 to be in the H state have a corresponding relationship with each other.

Based on the above principle, in the embodiments of the present disclosure, for example, the threshold value of the first driving voltage that is applied to the driving electrode 8 to control the cholesteric liquid crystal layer 2 to change into the H state serves as a representation of the liquid crystal arrangement state of the cholesteric liquid crystal layer 2. That is, the liquid crystal arrangement state of the cholesteric liquid crystal layer 2 is indicated by the threshold value of the first driving voltage applied to the driving electrode 8 to control a transition of the cholesteric liquid crystal layer 2 from the FC state to the H state. For example, experiments are performed to collect threshold values of the first driving voltage applied to the driving electrode 8 to control the transition of the cholesteric liquid crystal layer 2 from the FC state to the H state in a situation where the cholesteric liquid crystal layer 2 is subjected to different pressures, and the third correspondence table is established. In the actual pressure detecting process, for example, the first driving voltage output unit is used to output the first driving voltage to the driving electrode 8, and the value of the first driving voltage gradually increases from the value of the reference voltage; at the same time, the first liquid crystal state determiner unit is used to determine whether the liquid crystal in the cholesteric liquid crystal layer 2 is in the H state; in the situation where the first liquid crystal state determiner unit determines that the liquid crystal in the cholesteric liquid crystal layer 2 is in the H state, the first output controller unit records the value of the first driving voltage output by the first driving voltage output unit upon the liquid crystal in the cholesteric liquid crystal layer 2 changes into the H state, thereby obtaining the threshold value of the first driving voltage upon the cholesteric liquid crystal layer 2 is changed from the FC state to the H state, and then the third finder unit looks up the third correspondence table to determine the value of the pressure.

It should be noted that, after the first output controller unit records the value of the first driving voltage output by the first driving voltage output unit upon the liquid crystal in the cholesteric liquid crystal layer 2 changes into the H state, the first output controller unit controls the first driving voltage output unit to output the reference voltage. In this case, the first driving voltage rapidly drops to the reference voltage, the electric field in the liquid crystal cell 1 rapidly disappears, and the liquid crystal in the cholesteric liquid crystal layer undergoes vertical-horizontal relaxation, and relaxes from the H state to the P state to return to an initial state.

It should be noted that, the first liquid crystal determiner unit determines whether the cholesteric liquid crystal layer 2 is in the H state, for example, based on the light transmittance of the cholesteric liquid crystal layer 2 or the spectrum of the reflected light reflected by the cholesteric liquid crystal layer 2 described above.

Taking the detection of the light transmittance of the cholesteric liquid crystal layer 2 as an example, the experiments are performed in advance to obtain a light transmittance T1 corresponding to the cholesteric liquid crystal layer 2 in the H state, and then whether the light transmittance of the cholesteric liquid crystal layer 2 is equal to T1 is detected in real time in a process of gradually increasing the first driving voltage by the first driving voltage output unit. If the light transmittance of the cholesteric liquid crystal layer 2 is equal to T1, it is determined that the cholesteric liquid crystal layer 2 is in the H state; and if the light transmittance of the cholesteric liquid crystal layer 2 is not equal to T1, it is determined that the cholesteric liquid crystal layer 2 is not in the H state. It should be noted that in a situation where whether the cholesteric liquid crystal layer 2 is in the H state is determined based on the light transmittance of the cholesteric liquid crystal layer 2, the above-described technical solutions that are shown in FIG. 2 or FIG. 3 and include the light transmittance detector unit for example are combined with the technical solution shown in FIG. 5.

For example, in combination with the technical solution shown in FIG. 2, the first liquid crystal determiner unit includes the first light source, the first light intensity detector subunit and the light transmittance calculator subunit; the first light source is at a side of the liquid crystal cell 1 (taking the first light source at the side, provided with the pressure receiving surface, of the liquid crystal cell 1 as an example), and the first light source is configured to emit the light having the predetermined light-intensity to the liquid crystal cell 1; the first light intensity detector subunit is at the side of the cholesteric liquid crystal layer 2 facing away from the first light source, and the first light intensity detector subunit is configured to detect the transmitted-light intensity at the side of the cholesteric liquid crystal layer 2 facing away from the first light source; the light transmittance calculator subunit is configured to calculate the light transmittance of the cholesteric liquid crystal layer 2 according to the transmitted-light intensity and the predetermined light-intensity. Then, in the process of gradually increasing the first driving voltage by the first driving voltage output unit, whether the light transmittance of the cholesteric liquid crystal layer 2 is equal to T1 is detected in real time; if the light transmittance of the cholesteric liquid crystal layer 2 is equal to T1, it is determined that the cholesteric liquid crystal layer 2 is in the H state; and if the light transmittance of the cholesteric liquid crystal layer 2 is not equal to T1, it is determined that the cholesteric liquid crystal layer 2 is not in the H state. For example, the light transmittance calculator subunit is the light transmittance calculator sub-circuit. For example, the first light intensity detector subunit includes the first photoelectric conversion layer (the first photoelectric conversion layer comprises the photoelectric conversion material) 5 and the first data processor; the first photoelectric conversion layer 5 is coupled to the liquid crystal cell 1 and is configured to generate the electrical signal according to light transmitted to the side of the cholesteric liquid crystal layer 2 facing away from the first light source, and to output the electrical signal to the first data processor; the first data processor is connected with the first photoelectric conversion layer 5 and is configured to process the electrical signal output by the first photoelectric conversion layer 5 to obtain the corresponding transmitted-light intensity. For example, the first data processor is the first data processor circuit.

For example, in combination with the technical solution shown in FIG. 3 above, the first liquid crystal determiner unit includes the first light intensity detector subunit, the second light intensity detector subunit and the light transmittance calculator subunit; the second light intensity detector subunit is at the side of the cholesteric liquid crystal layer 2 facing the ambient light source, and the second light intensity detector subunit is configured to detect the incident-light intensity at the side of the cholesteric liquid crystal layer 2 facing the ambient light source; the first light intensity detector subunit is at the side of the cholesteric liquid crystal layer 2 facing away from the second light intensity detector submit, and the first light intensity detector subunit is configured to detect the transmitted-light intensity at the side of the cholesteric liquid crystal layer 2 facing away from the second light intensity detector submit; the light transmittance calculator subunit is configured to calculate the light transmittance of the cholesteric liquid crystal layer 2 according to the transmitted-light intensity and the incident-light intensity, and the light transmittance of the cholesteric liquid crystal layer 2 is equal to the ratio of the transmitted-light intensity to the incident-light intensity. In this case, there is no requirement for the light intensity of the light incident into the liquid crystal cell 1, that is, there is no requirement for the ambient light source, and for example, the ambient light source is any light source originally used in the place where the pressure sensor is applied. For example, the ambient light source is the natural light. For example, the natural light sequentially passes through the second light intensity detector subunit, the cholesteric liquid crystal layer 2 and the first light intensity detector subunit, the second light intensity detector subunit for example detects the light intensity of the natural light incident to the cholesteric liquid crystal layer 2, the first light intensity detector subunit for example detects the light intensity of the natural light emitted through the cholesteric liquid crystal layer 2, and the division operation is performed on the value of the light intensity detected by the first light intensity detector subunit and the value of the light intensity detected by the second light intensity detector subunit to obtain the light transmittance of the cholesteric liquid crystal layer 2. Then, in the process of gradually increasing the first driving voltage by the first driving voltage output unit, whether the light transmittance of the cholesteric liquid crystal layer 2 is equal to T1 is detected in real time; if the light transmittance of the cholesteric liquid crystal layer 2 is equal to T1, it is determined that the cholesteric liquid crystal layer 2 is in the H state; and if the light transmittance of the cholesteric liquid crystal layer 2 is not equal to T1, it is determined that the cholesteric liquid crystal layer 2 is not in the H state. For example, the first light intensity detector subunit includes the first photoelectric conversion layer (the first photoelectric conversion layer comprises the photoelectric conversion material) 5 and the first data processor; the first photoelectric conversion layer 5 is coupled to the liquid crystal cell 1 and is configured to generate the corresponding electrical signal according to the light transmitted to the side of the cholesteric liquid crystal layer 2 facing away from the ambient light source, and to output the electrical signal to the first data processor; the first data processor is connected with the first photoelectric conversion layer 5 and is configured to process the electrical signal output by the first photoelectric conversion layer 5 to obtain the corresponding transmitted-light intensity. For example, the first data processor is the first data processor circuit. For example, the second light intensity detector subunit includes the second photoelectric conversion layer (the second photoelectric conversion layer comprises the photoelectric conversion material) 7 and the second data processor; the second photoelectric conversion layer 7 is coupled to the liquid crystal cell 1 and is configured to generate the another electrical signal according to the light incident at the side of the cholesteric liquid crystal layer 2 facing the ambient source, and to output the another electrical signal to the second data processor; the second data processor is connected with the second photoelectric conversion layer 7 and is configured to process the another electrical signal output by the second photoelectric conversion layer 7 to obtain the corresponding incident-light intensity. For example, the second data processor is the second data processor circuit.

With continued reference to FIG. 5, taking the detection of the spectrum of the reflected light reflected by the cholesteric liquid crystal layer 2 (the reflected light spectrum of the cholesteric liquid crystal layer 2) as an example, the experiments are performed I advance to obtain a reflected light spectrum SP1 corresponding to the cholesteric liquid crystal layer 2 in the H state, and then whether the reflected light spectrum of the cholesteric liquid crystal layer 2 is SP1 is detected in real time in the process of gradually increasing the first driving voltage by the first driving voltage output unit; if the reflected light spectrum of the cholesteric liquid crystal layer 2 is SP1, it is determined that the cholesteric liquid crystal layer 2 is in the H state; and if the reflected light spectrum of the cholesteric liquid crystal layer 2 is not SP1, it is determined that the cholesteric liquid crystal layer 2 is not in the H state. It should be noted that in a situation where whether the cholesteric liquid crystal layer 2 is in the H state is determined based on the reflected light spectrum of the cholesteric liquid crystal layer 2, the above-described technical solution that is shown in FIG. 4 and includes the spectrum detector unit for example is combined with the technical solution shown in FIG. 5.

For example, in combination with the above-described technical solution of FIG. 4, the first liquid crystal determiner unit includes the spectrum detector unit configured for detecting the spectrum of the light reflected by the cholesteric liquid crystal layer 2. Then, in the process of gradually increasing the first driving voltage by the first driving voltage output unit, whether the reflected light spectrum of the cholesteric liquid crystal layer 2 is SP1 is detected in real time; if the reflected light spectrum of the cholesteric liquid crystal layer 2 is SP1, it is determined that the cholesteric liquid crystal layer 2 is in the H state; and if the reflected light spectrum of the cholesteric liquid crystal layer 2 is not SP1, it is determined that the cholesteric liquid crystal layer 2 is not in the H state. For example, the spectrum detector unit includes the spectrum detector.

Certainly, other technical means may be used in the embodiments of the present disclosure to determine whether the cholesteric liquid crystal layer 2 is in the H state, which should all fall within the protection scope of the present disclosure, and will not be exemplified herein.

In addition, in the drawings, only the case where the reference electrode 9 is disposed at the first substrate 3 and the driving electrode 8 is disposed at the second substrate 4 is exemplarily illustrated, and those skilled in the art should know that in the embodiments of the present disclosure, for example, the reference electrode 9 is disposed at the second substrate 4, and the driving electrode 8 is disposed at the first substrate 3.

Figure 6:
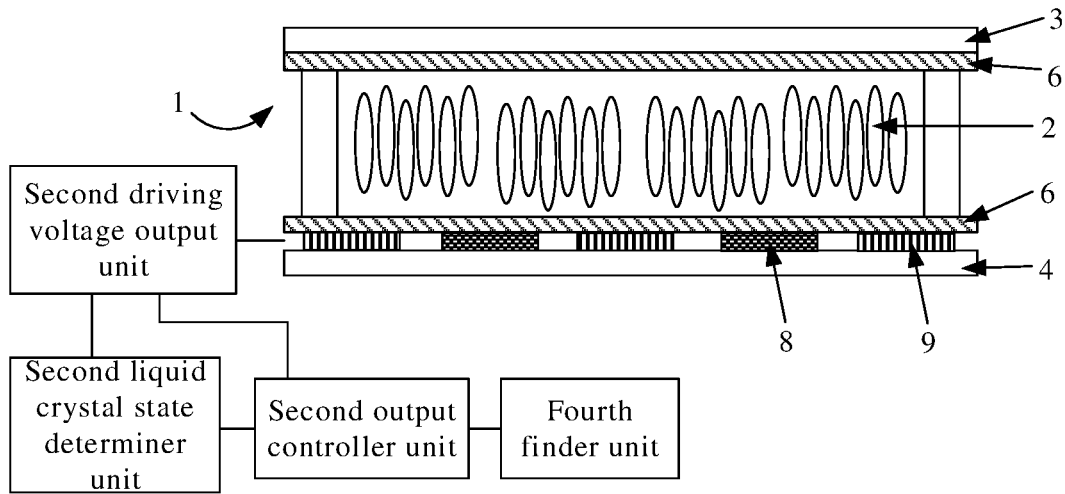
FIG. 6 is still another schematic structural diagram of the pressure sensor according to the embodiments of the present disclosure.

FIG. 6 is another schematic structural diagram of the pressure sensor according to the embodiments of the present disclosure. As shown in FIG. 6, the liquid crystal cell 1 includes the first substrate 3 and the second substrate 4 which are opposite to each other, the cholesteric liquid crystal layer 2 is between the first substrate 3 and the second substrate 4, the horizontally-oriented alignment layer 6 is between the cholesteric liquid crystal layer 2 and the first substrate 3, and the another horizontally-oriented alignment layer 6 is between the cholesteric liquid crystal layer 2 and the second substrate 4; one of the first substrate 3 and the second substrate 4 is provided with the reference electrode 9 and the driving electrode 8, the reference electrode 9 is configured to be loaded with the constant reference voltage, and the reference electrode 9 and the driving electrode 8 form a fringe horizontal electric field in the liquid crystal layer 2. The liquid crystal state detector module includes a second driving voltage output unit, a second liquid crystal state determiner unit and a second output controller unit; and the pressure finder module includes a fourth finder unit.

The second driving voltage output unit is connected with the driving electrode 8 and configured for outputting a second driving voltage to the driving electrode 8, and a value of the second driving voltage gradually increases from a value of the reference voltage. For example, the second driving voltage output unit is a second driving voltage output circuit.

The second liquid crystal state determiner unit is configured to determine whether the liquid crystal in the cholesteric liquid crystal layer 2 is in the planar texture state.

The second output controller unit is configured to record the second driving voltage that is output by the second driving voltage output unit upon the second liquid crystal determiner unit determines that the liquid crystal in the cholesteric liquid crystal layer is in the planar texture state, and then to control the second driving voltage output unit to output the reference voltage. The second output controller unit for example is a second output controller circuit.

The fourth finder unit is configured to find the pressure corresponding to the second driving voltage recorded by the second output controller unit from a fourth correspondence table, and the fourth correspondence table stores different second driving voltages and pressure values corresponding to the second driving voltages.

Based on the foregoing description, it is seen that in a situation where the cholesteric liquid crystal layer 2 is under the pressure, the cholesteric liquid crystal layer 2 is changed from the P state to the FC state, and is in the liquid crystal arrangement state corresponding to a value of the pressure. In this case, if the pressure is removed, the liquid crystal arrangement state remains stable under a certain condition (for example, being stable by means of surface treatment or polymer stabilization, etc.) to form the zero field stable state. In a situation where a sufficiently high horizontal electric field intensity E which is greater than $E_{c2}$ ($E_{c2}$ is a horizontal electric field threshold intensity in a situation where the liquid crystal undergoes a phase transition and finally exhibits the P state) is applied to the liquid crystal cell 1, all liquid crystal molecules change to align along a direction of the electric field due to the dielectric anisotropy of liquid crystal material. The horizontal electric field threshold intensity $E_{c2}$ in the situation where the liquid crystal undergoes the phase transition and finally exhibits the P state is related to the liquid crystal arrangement state of the cholesteric liquid crystal layer 2, and the two have a corresponding relationship. It is seen that the pressure, the liquid crystal arrangement state and the horizontal electric field threshold intensity in the P state have a corresponding relationship with each other.

Further, an intensity of the horizontal electric field is proportional to a voltage difference between the voltage applied to the driving electrode 8 (which is always greater than the reference voltage) and the voltage applied to the reference electrode 9, the intensity of the horizontal electric field is positively correlated with the second driving voltage applied to the driving electrode 8 in a situation where the reference voltage is constant. Therefore, the pressure, the liquid crystal arrangement state, and a threshold value of the second driving voltage that is applied to the driving electrode 8 to control the cholesteric liquid crystal layer 2 to be in the P state have a corresponding relationship with each other.

Based on the above principle, in the embodiments of the present disclosure, for example, the threshold value of the second driving voltage that is applied to the driving electrode 8 to control the cholesteric liquid crystal layer 2 to be in the P state serves as a representation of the liquid crystal arrangement state of the cholesteric liquid crystal layer 2. That is, the liquid crystal arrangement state of the cholesteric liquid crystal layer 2 is indicated by the threshold value of the second driving voltage applied to the driving electrode 8 to control a transition of the cholesteric liquid crystal layer 2 from the FC state to the P state. For example, experiments are performed in advance to collect threshold values of the second driving voltage applied to the driving electrode 8 to control the transition of the cholesteric liquid crystal layer 2 from the FC state to the P state in a situation where the cholesteric liquid crystal layer 2 is subjected to different pressures, and the fourth correspondence table is established. In the actual pressure detecting process, for example, the second driving voltage output unit is used to output the second driving voltage to the driving electrode 8, and the value of the second driving voltage gradually increases from the value of the reference voltage; at the same time, the second liquid crystal state determiner unit is used to determine whether the liquid crystal in the cholesteric liquid crystal layer 2 is in the P state; in the situation where the second liquid crystal state determiner unit determines that the liquid crystal in the cholesteric liquid crystal layer 2 is in the P state, the second output controller unit records the value of the second driving voltage output by the second driving voltage output unit upon the second liquid crystal state determiner unit determines that the liquid crystal in the cholesteric liquid crystal layer 2 is in the P state, thereby obtaining the threshold value of the second driving voltage upon the cholesteric liquid crystal layer 2 is changed from the FC state to the P state, and then the fourth finder unit looks up the fourth correspondence table to determine the value of the pressure.

It should be noted that, after the second output controller unit records the value of the second driving voltage output by the second driving voltage output unit upon the cholesteric liquid crystal layer 2 is changed from the FC state to the P state, the second output controller unit controls the second driving voltage output unit to output the reference voltage. In this case, the second driving voltage rapidly drops to the reference voltage, the electric field in the liquid crystal cell 1 quickly disappears, and the liquid crystal in the cholesteric liquid crystal layer maintains the initial state under the action of the alignment layers 6.

It should be noted that, the second liquid crystal determiner unit determining whether or not the cholesteric liquid crystal layer 2 is in the P state, for example, based on the light transmittance or the reflected light spectrum of the cholesteric liquid crystal layer 2 described above.

Taking the detection of the light transmittance of the cholesteric liquid crystal layer 2 as an example, the experiments are performed in advance to obtain a light transmittance T2 corresponding to the cholesteric liquid crystal layer 2 in the P state, and then whether the light transmittance of the cholesteric liquid crystal layer 2 is equal to T2 is detected in real time in a process of gradually increasing the second driving voltage by the second driving voltage output unit. If the light transmittance of the cholesteric liquid crystal layer 2 is equal to T2, it is determined that the cholesteric liquid crystal layer 2 is in the P state; and if the light transmittance of the cholesteric liquid crystal layer 2 is not equal to T2, it is determined that the cholesteric liquid crystal layer 2 is not in the P state. It should be noted that in a situation where whether the cholesteric liquid crystal layer 2 is in the P state is determined based on the light transmittance of the cholesteric liquid crystal layer 2, the above-described technical solutions that are shown in FIG. 2 or FIG. 3 and include the light transmittance detector unit for example are combined with the technical solution shown in FIG. 6.

For example, in combination with the technical solution shown in FIG. 2, the second liquid crystal determiner unit includes the first light source, the first light intensity detector subunit and the light transmittance calculator subunit; the first light source is at a side of the liquid crystal cell 1 (taking the first light source at the side, provided with the pressure receiving surface, of the liquid crystal cell 1 as an example), and the first light source is configured to emit the light having the predetermined light-intensity to the liquid crystal cell 1; the first light intensity detector subunit is at the side of the cholesteric liquid crystal layer 2 facing away from the first light source, and the first light intensity detector subunit is configured to detect the transmitted-light intensity at the side of the cholesteric liquid crystal layer 2 facing away from the first light source; the light transmittance calculator subunit is configured to calculate the light transmittance of the cholesteric liquid crystal layer 2 according to the transmitted-light intensity and the predetermined light-intensity. Then, in the process of gradually increasing the second driving voltage by the second driving voltage output unit, whether the light transmittance of the cholesteric liquid crystal layer 2 is equal to T2 is detected in real time; if the light transmittance of the cholesteric liquid crystal layer 2 is equal to T2, it is determined that the cholesteric liquid crystal layer 2 is in the P state; and if the light transmittance of the cholesteric liquid crystal layer 2 is not equal to T2, it is determined that the cholesteric liquid crystal layer 2 is not in the P state. For example, the light transmittance calculator subunit is the light transmittance calculator sub-circuit. For example, the first light intensity detector subunit includes the first photoelectric conversion layer (the first photoelectric conversion layer comprises the photoelectric conversion material) 5 and the first data processor; the first photoelectric conversion layer 5 is coupled to the liquid crystal cell 1 and is configured to generate the corresponding electrical signal according to light transmitted to the side of the cholesteric liquid crystal layer 2 facing away from the first light source, and to output the electrical signal to the first data processor; the first data processor is connected with the first photoelectric conversion layer 5 and is configured to process the electrical signal output by the first photoelectric conversion layer 5 to obtain the transmitted-light intensity. For example, the first data processor is the first data processor circuit.

For example, in combination with the technical solution shown in FIG. 3 above, the second liquid crystal determiner unit includes the first light intensity detector subunit, the second light intensity detector subunit and the light transmittance calculator subunit; the second light intensity detector subunit is at the side of the cholesteric liquid crystal layer 2 facing the ambient light source, and the second light intensity detector subunit is configured to detect the incident-light intensity at the side of the cholesteric liquid crystal layer 2 facing the ambient light source; the first light intensity detector subunit is at the side of the cholesteric liquid crystal layer 2 facing away from the second light intensity detector submit, and the first light intensity detector subunit is configured to detect the transmitted-light intensity at the side of the cholesteric liquid crystal layer 2 facing away from the second light intensity detector submit; the light transmittance calculator subunit is configured to calculate the light transmittance of the cholesteric liquid crystal layer 2 according to the transmitted-light intensity and the incident-light intensity, and the light transmittance of the cholesteric liquid crystal layer 2 is equal to the ratio of the transmitted-light intensity to the incident-light intensity. In this case, there is no requirement for the light intensity of the light incident into the liquid crystal cell 1, that is, there is no requirement for the ambient light source, and for example, the ambient light source is any light source originally used in the place where the pressure sensor is applied. For example, the ambient light source is the natural light. For example, the natural light sequentially passes through the second light intensity detector subunit, the cholesteric liquid crystal layer 2 and the first light intensity detector subunit, the second light intensity detector subunit for example detects the light intensity of the natural light incident to the cholesteric liquid crystal layer 2, the first light intensity detector subunit for example detects the light intensity of the natural light emitted through the cholesteric liquid crystal layer 2, and the division operation is performed on the value of the light intensity detected by the first light intensity detector subunit and the value of the light intensity detected by the second light intensity detector subunit to obtain the light transmittance of the cholesteric liquid crystal layer 2. Then, in the process of gradually increasing the second driving voltage by the second driving voltage output unit, whether the light transmittance of the cholesteric liquid crystal layer 2 is equal to T2 is detected in real time; if the light transmittance of the cholesteric liquid crystal layer 2 is equal to T2, it is determined that the cholesteric liquid crystal layer 2 is in the P state; and if the light transmittance of the cholesteric liquid crystal layer 2 is not equal to T2, it is determined that the cholesteric liquid crystal layer 2 is not in the P state. For example, the first light intensity detector subunit includes the first photoelectric conversion layer (the first photoelectric conversion layer comprises the photoelectric conversion material) 5 and the first data processor; the first photoelectric conversion layer 5 is coupled to the liquid crystal cell 1 and is configured to generate the electrical signal according to the light transmitted to the side of the cholesteric liquid crystal layer 2 facing away from the ambient light source, and to output the electrical signal to the first data processor; the first data processor is connected with the first photoelectric conversion layer 5 and is configured to process the electrical signal output by the first photoelectric conversion layer 5 to obtain the transmitted-light intensity. For example, the first data processor is the first data processor circuit. For example, the second light intensity detector subunit includes the second photoelectric conversion layer (the second photoelectric conversion layer comprises the photoelectric conversion material) 7 and the second data processor; the second photoelectric conversion layer 7 is coupled to the liquid crystal cell 1 and is configured to generate the another electrical signal according to the light incident at the side of the cholesteric liquid crystal layer 2 facing the ambient source, and to output the another electrical signal to the second data processor; the second data processor is connected with the second photoelectric conversion layer 7 and is configured to process the another electrical signal output by the second photoelectric conversion layer 7 to obtain the incident-light intensity. For example, the second data processor is the second data processor circuit.

With continued reference to FIG. 6, taking the detection of the reflected light spectrum of the cholesteric liquid crystal layer 2 as an example, the experiments are performed in advance to obtain a reflected light spectrum SP2 corresponding to the cholesteric liquid crystal layer 2 in the P state, and then whether the reflected light spectrum of the cholesteric liquid crystal layer 2 is SP2 is detected in real time in the process of gradually increasing the second driving voltage by the second driving voltage output unit; if the reflected light spectrum of the cholesteric liquid crystal layer 2 is SP2, it is determined that the cholesteric liquid crystal layer 2 is in the P state; and if the reflected light spectrum of the cholesteric liquid crystal layer 2 is not SP2, it is determined that the cholesteric liquid crystal layer 2 is not in the P state. It should be noted that in a situation where whether the cholesteric liquid crystal layer 2 is in the P state is determined based on the reflected light spectrum of the cholesteric liquid crystal layer 2, the above-described technical solution that is shown in FIG. 4 and includes the spectrum detector unit for example is combined with the technical solution shown in FIG. 6.

For example, in combination with the above-described technical solution of FIG. 4, the second liquid crystal determiner unit includes the spectrum detector unit configured for detecting the spectrum of the light reflected by the cholesteric liquid crystal layer 2. Then, in the process of gradually increasing the second driving voltage by the second driving voltage output unit, whether the reflected light spectrum of the cholesteric liquid crystal layer 2 is SP2 is detected in real time; if the reflected light spectrum of the cholesteric liquid crystal layer 2 is SP2, it is determined that the cholesteric liquid crystal layer 2 is in the P state; and if the reflected light spectrum of the cholesteric liquid crystal layer 2 is not SP2, it is determined that the cholesteric liquid crystal layer 2 is not in the P state. For example, the spectrum detector unit includes the spectrum detector.

Certainly, other technical means may be used in the embodiments of the present disclosure to determine whether the cholesteric liquid crystal layer 2 is in the P state, which should all fall within the protection scope of the present disclosure, and will not be exemplified herein.

In addition, in the drawings, only the case where the driving electrode 8 and the reference electrode 9 are both disposed at the second substrate 4 is exemplarily shown, and those skilled in the art should know that in the embodiments of the present disclosure, for example, the driving electrode 8 and the reference electrode 9 are both at the first substrate 3.

Figure 7:
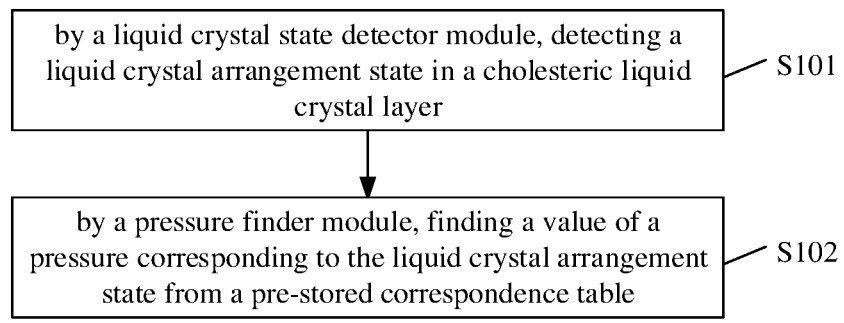
FIG. 7 is a flowchart of a pressure detecting method according to the embodiments of the present disclosure.

FIG. 7 is a flowchart of a pressure detecting method according to the embodiments of the present disclosure. As shown in FIG. 7, the pressure detecting method is based on the pressure sensor in the above embodiments. For the descriptions of the pressure sensor, the above embodiments may be referred to. Repeated descriptions are omitted herein. The pressure detecting method includes the following steps.

Step S101: by the liquid crystal state detector module, detecting the liquid crystal arrangement state in the cholesteric liquid crystal layer.

Step S102: by the pressure finder module, finding the value of the pressure corresponding to the liquid crystal arrangement state from the pre-stored correspondence table.

For the detailed descriptions of the foregoing steps S101 and S102, the corresponding content in the foregoing embodiments may be referred to, and repeated descriptions are omitted herein.

Figure 8:
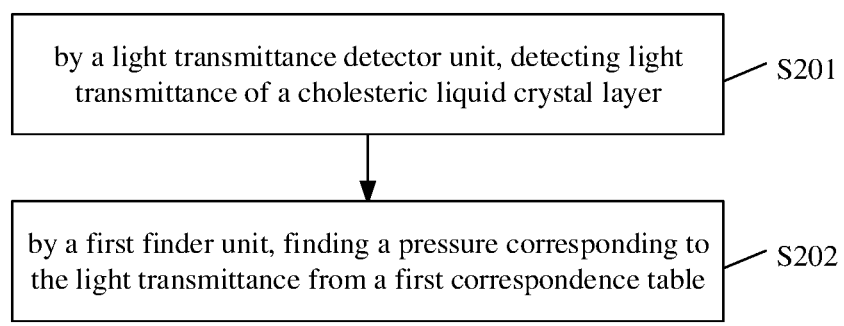
FIG. 8 is another flowchart of the pressure detecting method according to the embodiments of the present disclosure.

FIG. 8 is a flowchart of the pressure detecting method according to the embodiments of the present disclosure. As shown in FIG. 8, the pressure detecting method is based on the pressure sensor shown in FIG. 2 or FIG. 3, the description of the pressure sensor may be referred to the above content corresponding to FIG. 2 and FIG. 3, and repeated descriptions are omitted herein. The pressure detecting method includes the following steps.

Step S201, by the light transmittance detector unit, detecting the light transmittance of the cholesteric liquid crystal layer, in which the light transmittance that is detected serves as the representation of the liquid crystal arrangement state in the cholesteric liquid crystal layer.

In a situation where the pressure sensor shown in FIG. 2 is used, the step S201 includes, for example: firstly, by the first light source, emitting the light having the predetermined light-intensity to the liquid crystal cell; then, by the first light intensity detector subunit, detecting the transmitted-light intensity at the side of the cholesteric liquid crystal layer facing away from the first light source; finally, by the light transmittance calculator subunit, calculating the light transmittance of the cholesteric liquid crystal layer according to the transmitted-light intensity and the predetermined light-intensity, in which the light transmittance of the cholesteric liquid crystal layer is equal to the ratio of the transmitted-light intensity to the predetermined light-intensity.

In a situation where the pressure sensor shown in FIG. 3 is used, the step S201 includes: firstly, by the second light intensity detector subunit, detecting the incident-light intensity at the side of the cholesteric liquid crystal layer facing the ambient light source; then, by the first light intensity detector subunit, detecting the transmitted-light intensity at the side of the cholesteric liquid crystal layer facing away from the second light intensity detector submit; finally, by the light transmittance calculator subunit, calculating the light transmittance of the cholesteric liquid crystal layer according to the transmitted-light intensity and the incident-light intensity, in which the light transmittance of the cholesteric liquid crystal layer is equal to the ratio of the transmitted-light intensity to the incident-light intensity.

Step S202: by the first finder unit, finding the pressure corresponding to the light transmittance from the first correspondence table, in which the first correspondence table stores different light transmittances and pressure values corresponding to the light transmittances.

For the detailed description of the foregoing steps S201 and S202, the content corresponding to FIG. 2 and FIG. 3 may be referred to, and details are not described herein again.

Figure 9:
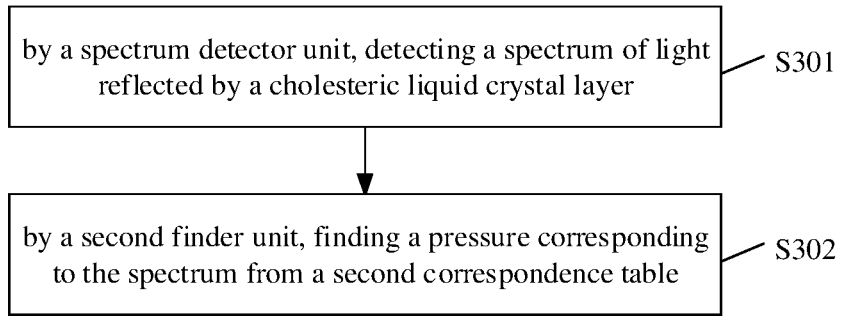
FIG. 9 is still another flowchart of the pressure detecting method according to the embodiments of the present disclosure.

FIG. 9 is another flow chart of the pressure detecting method according to the embodiments of the present disclosure. As shown in FIG. 9, the pressure detecting method is based on the pressure sensor in FIG. 4, the description of the pressure sensor may be referred to the above content corresponding to FIG. 4, and repeated descriptions are omitted herein. The pressure detecting method includes the following steps.

Step S301, by the spectrum detector unit, detecting the spectrum of the light reflected by the cholesteric liquid crystal layer, in which the spectrum that is detected serves as the representation of the liquid crystal arrangement state in the cholesteric liquid crystal layer.

For example, the light that is incident to the cholesteric liquid crystal layer is the ambient light, for example, the ambient light is the natural light, the spectrum detector unit is the spectrum detector, and the spectrum detector detects the spectrum of reflected light that is formed by the natural light reflected by the cholesteric liquid crystal layer.

Step S302: by the second finder unit, finding the pressure corresponding to the spectrum from the second correspondence table, in which the second correspondence table stores different spectrums and pressure values corresponding to the spectrums.

For the detailed description of the above steps S301 and S302, refer to the content corresponding to FIG. 4, and details are not described herein again.

Figure 10:
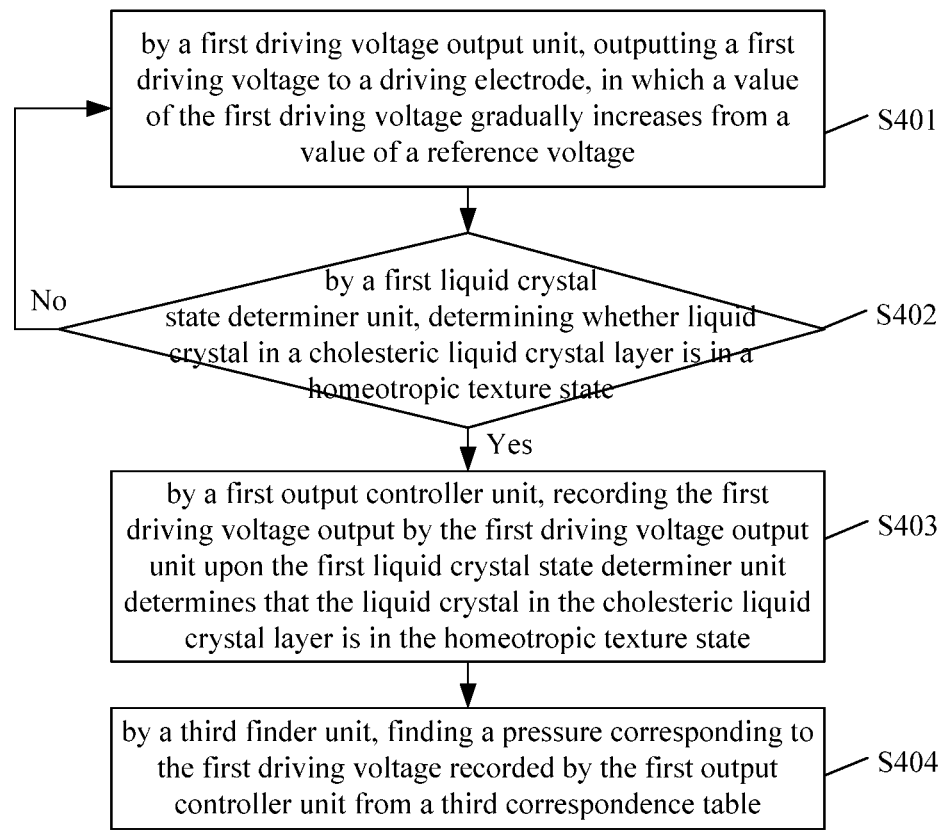
FIG. 10 is still another flowchart of the pressure detecting method according to the embodiments of the present disclosure.

FIG. 10 is another flow chart of the pressure detecting method according to the embodiments of the present disclosure. As shown in FIG. 10, the pressure detecting method is based on the pressure sensor in FIG. 5 above, the description of the pressure sensor may be referred to the above content corresponding to FIG. 5, and repeated descriptions are omitted herein. The pressure detecting method includes the following steps.

Step S401, by the first driving voltage output unit, outputting the first driving voltage to the driving electrode, in which the value of the first driving voltage gradually increases from the value of the reference voltage;

Step S402: by the first liquid crystal state determiner unit, determining whether the liquid crystal in the cholesteric liquid crystal layer is in the homeotropic texture state.

In a situation where the first liquid crystal state determiner unit determines that the liquid crystal in the cholesteric liquid crystal layer is in the homeotropic texture state, a step S403 is performed; otherwise, the step S401 is performed.

Step S403, by the first output controller unit, recording the first driving voltage output by the first driving voltage output unit upon the first liquid crystal state determiner unit determines that the liquid crystal in the cholesteric liquid crystal layer is in the homeotropic texture state, and then controlling the first driving voltage output unit to output the reference voltage.

Step S404: by the third finder unit, finding the pressure corresponding to the first driving voltage recorded by the first output controller unit from the third correspondence table, in which the third correspondence table stores different first driving voltages and pressure values corresponding to the first driving voltages.

For the detailed description of the above steps S401 to S404, refer to the content corresponding to FIG. 5, and details are not described herein again.

Figure 11:
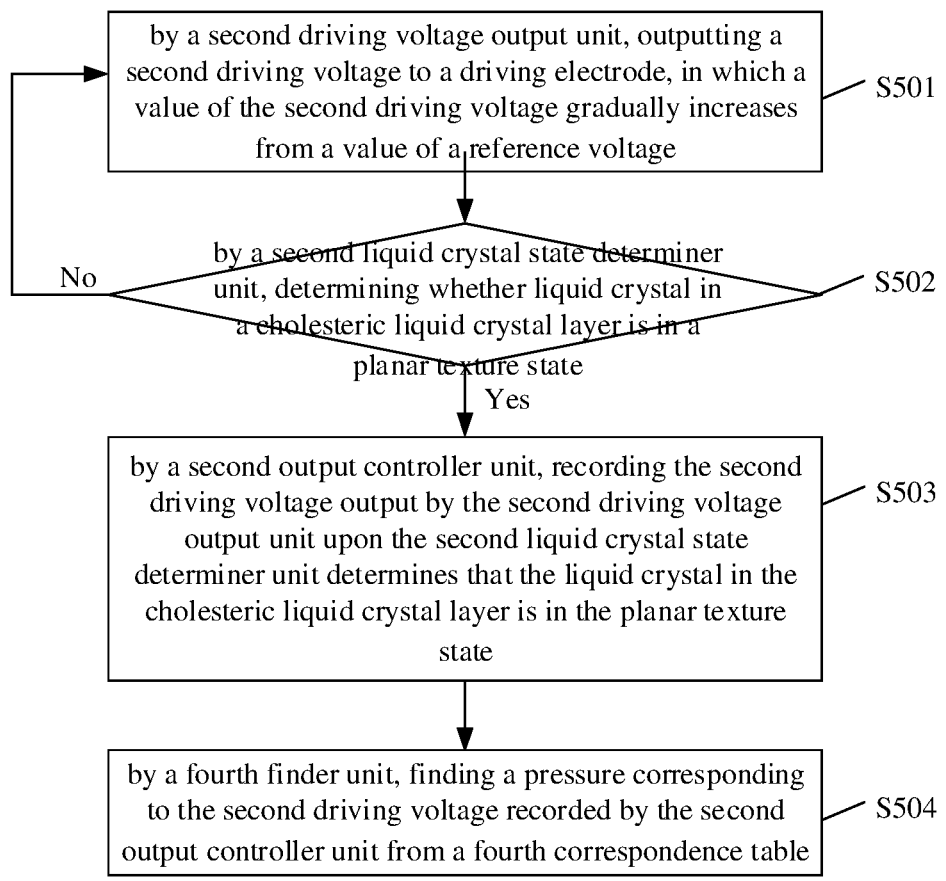
FIG. 11 is still another flowchart of the pressure detecting method according to the embodiments of the present disclosure.

FIG. 11 is another flowchart of the pressure detecting method according to the embodiments of the present disclosure. As shown in FIG. 11, the pressure detecting method is based on the pressure sensor in FIG. 6 described above, the description of the pressure sensor may be referred to the above content corresponding to FIG. 6, and repeated descriptions are omitted herein. The pressure detecting method includes the following steps.

Step S501, by the second driving voltage output unit, outputting the second driving voltage to the driving electrode, in which the value of the second driving voltage gradually increases from the value of the reference voltage;

Step S502: by the second liquid crystal state determiner unit, determining whether the liquid crystal in the cholesteric liquid crystal layer is in the planar texture state;

In a situation where the second liquid crystal state determiner unit determines that the liquid crystal in the cholesteric liquid crystal layer is in the planar texture state, a step S503 is performed; otherwise, the step S501 is performed.

Step S503, by the second output controller unit, recording the second driving voltage output by the second driving voltage output unit upon the second liquid crystal state determiner unit determines that the liquid crystal in the cholesteric liquid crystal layer is in the planar texture state, and then controlling the second driving voltage output unit to output the reference voltage;

Step S504: by the fourth finder unit, finding the pressure corresponding to the second driving voltage recorded by the second output controller unit from the fourth correspondence table, in which the fourth correspondence table stores different second driving voltages and pressure values corresponding to the second driving voltages.

For the detailed description of the above steps S501 to S504, refer to the content corresponding to FIG. 6, and details are not described herein again.

What are described above are related to the illustrative embodiments of the disclosure only and not limitative to the scope of the disclosure; the scopes of the disclosure are defined by the accompanying claims.

What is claimed is:

1. A pressure sensor, comprising: a liquid crystal cell comprising a first substrate and a second substrate which are opposite to each other, a cholesteric liquid crystal layer between the first substrate and the second substrate, a horizontally-oriented alignment layer between the cholesteric liquid crystal layer and the first substrate, and another horizontally-oriented alignment layer between the cholesteric liquid crystal layer and the second substrate; a liquid crystal state detector module and a pressure finder module, wherein the liquid crystal cell comprises a pressure receiving surface;

the liquid crystal state detector module is configured to detect a liquid crystal arrangement state in the cholesteric liquid crystal layer in a situation where a pressure is applied on the pressure receiving surface of the liquid crystal cell; and the pressure finder module is configured to find a value of the pressure corresponding to the liquid crystal arrangement state from a pre-stored correspondence table.

2. The pressure sensor according to claim 1, wherein the liquid crystal state detector module comprises a light transmittance detector unit;

the light transmittance detector unit is configured to detect a light transmittance of the cholesteric liquid crystal layer, and the light transmittance that is detected represents the liquid crystal arrangement state in the cholesteric liquid crystal layer;

the pressure finder module comprises a first finder unit;

the first finder unit is configured to find the pressure corresponding to the light transmittance from a first correspondence table, and the first correspondence table stores different light transmittances and pressure values corresponding to the light transmittances.

3. The pressure sensor according to claim 2, wherein the light transmittance detector unit comprises a first light source, a first light intensity detector subunit and a light transmittance calculator subunit;

the first light source is at a side of the liquid crystal cell and is configured to emit light having a predetermined light-intensity to the liquid crystal cell;

the first light intensity detector subunit is at a side of the cholesteric liquid crystal layer facing away from the first light source, and the first light intensity detector subunit is configured to detect a transmitted-light intensity at the side of the cholesteric liquid crystal layer facing away from the first light source;

the light transmittance calculator subunit is configured to calculate the light transmittance of the cholesteric liquid crystal layer according to the transmitted-light intensity and the predetermined light-intensity, and the light transmittance of the cholesteric liquid crystal layer is equal to a ratio of the transmitted-light intensity to the predetermined light-intensity.

4. The pressure sensor according to claim 3, wherein the first light intensity detector subunit comprises a first photoelectric conversion layer and a first data processor;

the first photoelectric conversion layer is coupled to the liquid crystal cell and is configured to generate an electrical signal according to light transmitted to the side of the cholesteric liquid crystal layer facing away from the first light source, and to output the electrical signal to the first data processor;

the first data processor is connected with the first photoelectric conversion layer and is configured to process the electrical signal output by the first photoelectric conversion layer to obtain the transmitted-light intensity corresponding to the electrical signal.

5. The pressure sensor according to claim 2, wherein light transmittance detector unit comprises a first light intensity detector subunit, a second light intensity detector subunit and a light transmittance calculator subunit;

the second light intensity detector subunit is at a side of the cholesteric liquid crystal layer facing an ambient light source, and the second light intensity detector subunit is configured to detect an incident-light intensity at the side of the cholesteric liquid crystal layer facing the ambient light source;

the first light intensity detector subunit is at a side of the cholesteric liquid crystal layer facing away from the second light intensity detector submit, and the first light intensity detector subunit is configured to detect a transmitted-light intensity at the side of the cholesteric liquid crystal layer facing away from the second light intensity detector submit;

the light transmittance calculator subunit is configured to calculate the light transmittance of the cholesteric liquid crystal layer according to the transmitted-light intensity and the incident-light intensity, and the light transmittance of the cholesteric liquid crystal layer is equal to a ratio of the transmitted-light intensity to the incident-light intensity.

6. The pressure sensor according to claim 5, wherein the first light intensity detector subunit comprises a first photoelectric conversion layer and a first data processor;

the first photoelectric conversion layer is coupled to the liquid crystal cell and is configured to generate an electrical signal according to light transmitted to the side of the cholesteric liquid crystal layer facing away from the ambient source, and to output the electrical signal to the first data processor;

the first data processor is connected with the first photoelectric conversion layer and is configured to process the electrical signal output by the first photoelectric conversion layer to obtain the transmitted-light intensity corresponding to the electrical signal;
the second light intensity detector subunit comprises a second photoelectric conversion layer and a second data processor;
the second photoelectric conversion layer is coupled to the liquid crystal cell and is configured to generate another electrical signal according to light incident at the side of the cholesteric liquid crystal layer facing the ambient source, and to output the another electrical signal to the second data processor;
the second data processor is connected with the second photoelectric conversion layer and is configured to process the another electrical signal output by the second photoelectric conversion layer to obtain the incident-light intensity corresponding to the another electrical signal.

7. The pressure sensor according to claim 1, wherein
the liquid crystal state detector module comprises a spectrum detector unit;
the spectrum detector unit is configured to detect a spectrum of light reflected by the cholesteric liquid crystal layer, and the spectrum that is detected represents the liquid crystal arrangement state in the cholesteric liquid crystal layer;
the pressure finder module comprises a second finder unit;
the second finder unit is configured to find the pressure corresponding to the spectrum from a second correspondence table, and the second correspondence table stores different spectrums and pressure values corresponding to the spectrums.

8. The pressure sensor according to claim 7, wherein
the spectrum detector unit comprises a spectrum detector;
the spectrum detector is at a side of the liquid crystal cell and is configured to detect the spectrum of reflected light formed by natural light that is reflected by the cholesteric liquid crystal layer.

9. The pressure sensor according to claim 1, wherein
the liquid crystal cell comprises a first substrate and a second substrate which are opposite to each other, the cholesteric liquid crystal layer is between the first substrate and the second substrate, a horizontally-oriented alignment layer is between the cholesteric liquid crystal layer and the first substrate, and another horizontally-oriented alignment layer is between the cholesteric liquid crystal layer and the second substrate;
one of the first substrate and the second substrate is provided with a reference electrode, the other one of the first substrate and the second substrate is provided with a driving electrode, and the reference electrode is configured to be loaded with a constant reference voltage;
the liquid crystal state detector module comprises a first driving voltage output unit, a first liquid crystal state determiner unit and a first output controller unit;
the first driving voltage output unit is connected with the driving electrode and configured to output a first driving voltage to the driving electrode, and a value of the first driving voltage is configured to increase gradually from a value of the reference voltage;
the first liquid crystal state determiner unit is configured to determine whether liquid crystal in the cholesteric liquid crystal layer is in a homeotropic texture state;
the first output controller unit is configured to record the first driving voltage that is output by the first driving voltage output unit upon the first liquid crystal determiner unit determines that the liquid crystal in the cholesteric liquid crystal layer is in the homeotropic texture state, and then to control the first driving voltage output unit to output the reference voltage;
the pressure finder module comprises a third finder unit;
the third finder unit is configured to find the pressure corresponding to the first driving voltage recorded by the first output controller unit from a third correspondence table, and the third correspondence table stores different first driving voltages and pressure values corresponding to the first driving voltages.

10. The pressure sensor according to claim 9, wherein
the first liquid crystal state determiner unit comprises a first light source, a first light intensity detector subunit and a light transmittance calculator subunit;
the first light source is at a side of the liquid crystal cell and is configured to emit light having a predetermined light-intensity to the liquid crystal cell;
the first light intensity detector subunit is at a side of the cholesteric liquid crystal layer facing away from the first light source, and is configured to detect a transmitted-light intensity at the side of the cholesteric liquid crystal layer facing away from the first light source; the first light intensity detector subunit comprises a first photoelectric conversion layer and a first data processor; the first photoelectric conversion layer is coupled to the liquid crystal cell and is configured to generate an electrical signal according to light transmitted to the side of the cholesteric liquid crystal layer facing away from the first light source, and to output the electrical signal to the first data processor; the first data processor is connected with the first photoelectric conversion layer and is configured to process the electrical signal output by the first photoelectric conversion layer to obtain the transmitted-light intensity corresponding to the electrical signal;
the light transmittance calculator subunit is configured to calculate a light transmittance of the cholesteric liquid crystal layer according to the transmitted-light intensity and the predetermined light-intensity, and the light transmittance of the cholesteric liquid crystal layer is equal to a ratio of the transmitted-light intensity to the predetermined light-intensity;
the first liquid crystal state determiner unit determines whether the liquid crystal in the cholesteric liquid crystal layer is in the homeotropic texture state according to the light transmittance.

11. The pressure sensor according to claim 9, wherein
the first liquid crystal state determiner unit comprises a first light intensity detector subunit, a second light intensity detector subunit and a light transmittance calculator subunit;
the second light intensity detector subunit is at a side of the cholesteric liquid crystal layer facing an ambient light source; and the first light intensity detector subunit is at a side of the cholesteric liquid crystal layer facing away from the second light intensity detector submit;
the first light intensity detector subunit is configured to detect a transmitted-light intensity at the side of the cholesteric liquid crystal layer facing away from the second light intensity detector submit; the first light intensity detector subunit comprises a first photoelectric conversion layer and a first data processor; the first photoelectric conversion layer is coupled to the liquid crystal cell and is configured to generate an electrical signal according to light transmitted to the side of the cholesteric liquid crystal layer facing away from the ambient source, and to output the electrical signal to the first data processor; the first data processor is connected with the first photoelectric conversion layer and is configured to process the electrical signal output by the first photoelectric conversion layer to obtain the transmitted-light intensity corresponding to the electrical signal;

the second light intensity detector subunit is configured to detect an incident-light intensity at the side of the cholesteric liquid crystal layer facing the ambient light source; the second light intensity detector subunit comprises a second photoelectric conversion layer and a second data processor; the second photoelectric conversion layer is coupled to the liquid crystal cell and is configured to generate another electrical signal according to light incident at the side of the cholesteric liquid crystal layer facing the ambient source, and to output the another electrical signal to the second data processor; the second data processor is connected with the second photoelectric conversion layer and is configured to process the another electrical signal output by the second photoelectric conversion layer to obtain the incident-light intensity corresponding to the another electrical signal;

the light transmittance calculator subunit is configured to calculate a light transmittance of the cholesteric liquid crystal layer according to the transmitted-light intensity and the incident-light intensity, and the light transmittance of the cholesteric liquid crystal layer is equal to a ratio of the transmitted-light intensity to the incident-light intensity;

the first liquid crystal state determiner unit determines whether the liquid crystal in the cholesteric liquid crystal layer is in the homeotropic texture state according to the light transmittance.

12. The pressure sensor according to claim 9, wherein the first liquid crystal state determiner unit comprises a spectrum detector unit;

the spectrum detector unit is configured to detect a spectrum of light reflected by the cholesteric liquid crystal layer; the spectrum detector unit comprises a spectrum detector; the spectrum detector is at a side of the liquid crystal cell and is configured to detect the spectrum of reflected light formed by natural light that is reflected by the cholesteric liquid crystal layer;

the first liquid crystal state determiner unit determines whether the liquid crystal in the cholesteric liquid crystal layer is in the homeotropic texture state according to the spectrum.

13. The pressure sensor according to claim 1, wherein the liquid crystal cell comprises a first substrate and a second substrate which are opposite to each other, the cholesteric liquid crystal layer is between the first substrate and the second substrate, a horizontally-oriented alignment layer is between the cholesteric liquid crystal layer and the first substrate, and another horizontally-oriented alignment layer is between the cholesteric liquid crystal layer and the second substrate; one of the first substrate and the second substrate is provided with a reference electrode and a driving electrode, and the reference electrode is configured to be loaded with a constant reference voltage;

the liquid crystal state detector module comprises a second driving voltage output unit, a second liquid crystal state determiner unit and a second output controller unit;

the second driving voltage output unit is connected with the driving electrode and configured to output a second driving voltage to the driving electrode, and a value of the second driving voltage is configured to increase gradually from a value of the reference voltage;

the second liquid crystal state determiner unit is configured to determine whether liquid crystal in the cholesteric liquid crystal layer is in a planar texture state;

the second output controller unit is configured to record the second driving voltage that is output by the second driving voltage output unit upon the second liquid crystal determiner unit determines that the liquid crystal in the cholesteric liquid crystal layer is in the planar texture state, and then to control the second driving voltage output unit to output the reference voltage;

the pressure finder module comprises a fourth finder unit;

the fourth finder unit is configured to find the pressure corresponding to the second driving voltage recorded by the second output controller unit from a fourth correspondence table, and the fourth correspondence table stores different second driving voltages and pressure values corresponding to the second driving voltages.

14. The pressure sensor according to claim 13, wherein the second liquid crystal state determiner unit comprises a first light source, a first light intensity detector subunit and a light transmittance calculator subunit;

the first light source is at a side of the liquid crystal cell and is configured to emit light having a predetermined light-intensity to the liquid crystal cell;

the first light intensity detector subunit is at a side of the cholesteric liquid crystal layer facing away from the first light source, and is configured to detect a transmitted-light intensity at the side of the cholesteric liquid crystal layer facing away from the first light source; the first light intensity detector subunit comprises a first photoelectric conversion layer and a first data processor; the first photoelectric conversion layer is coupled to the liquid crystal cell and is configured to generate an electrical signal according to light transmitted to the side of the cholesteric liquid crystal layer facing away from the first light source, and to output the electrical signal to the first data processor; the first data processor is connected with the first photoelectric conversion layer and is configured to process the electrical signal output by the first photoelectric conversion layer to obtain the transmitted-light intensity corresponding to the electrical signal;

the light transmittance calculator subunit is configured to calculate a light transmittance of the cholesteric liquid crystal layer according to the transmitted-light intensity and the predetermined light-intensity, and the light transmittance of the cholesteric liquid crystal layer is equal to a ratio of the transmitted-light intensity to the predetermined light-intensity;

the second liquid crystal state determiner unit determines whether the liquid crystal in the cholesteric liquid crystal layer is in the planar texture state according to the light transmittance.

15. The pressure sensor according to claim 13, wherein
the second liquid crystal state determiner unit comprises a first light intensity detector subunit, a second light intensity detector subunit and a light transmittance calculator subunit;
the second light intensity detector subunit is at a side of the cholesteric liquid crystal layer facing an ambient light source, and the first light intensity detector subunit is at a side of the cholesteric liquid crystal layer facing away from the second light intensity detector submit;
the first light intensity detector subunit is configured to detect a transmitted-light intensity at the side of the cholesteric liquid crystal layer facing away from the second light intensity detector submit; the first light intensity detector subunit comprises a first photoelectric conversion layer and a first data processor subunit; the first photoelectric conversion layer is coupled to the liquid crystal cell and is configured to generate an electrical signal according to light transmitted to the side of the cholesteric liquid crystal layer facing away from the ambient source, and to output the electrical signal to the first data processor; the first data processor is connected with the first photoelectric conversion layer and is configured to process the electrical signal output by the first photoelectric conversion layer to obtain the transmitted-light intensity corresponding to the another electrical signal;
the second light intensity detector subunit is configured to detect an incident-light intensity at the side of the cholesteric liquid crystal layer facing the ambient light source; the second light intensity detector subunit comprises a second photoelectric conversion layer and a second data processor; the second photoelectric conversion layer is coupled to the liquid crystal cell and is configured to generate another electrical signal according to light incident at the side of the cholesteric liquid crystal layer facing the ambient source, and to output the another electrical signal to the second data processor; the second data processor is connected with the second photoelectric conversion layer and is configured to process the another electrical signal output by the second photoelectric conversion layer to obtain the incident-light intensity corresponding to the another electrical signal;
the light transmittance calculator subunit is configured to calculate a light transmittance of the cholesteric liquid crystal layer according to the transmitted-light intensity and the incident-light intensity, and the light transmittance of the cholesteric liquid crystal layer is equal to a ratio of the transmitted-light intensity to the incident-light intensity;
the second liquid crystal state determiner unit determines whether the liquid crystal in the cholesteric liquid crystal layer is in the planar texture state according to the light transmittance.

16. The pressure sensor according to claim 13, wherein
the second liquid crystal state determiner unit comprises a spectrum detector unit;
the spectrum detector unit is configured to detect a spectrum of light reflected by the cholesteric liquid crystal layer; the spectrum detector unit comprises a spectrum detector; the spectrum detector is at a side of the liquid crystal cell and is configured to detect the spectrum of reflected light formed by natural light that is reflected by the cholesteric liquid crystal layer;
the second liquid crystal state determiner unit determines whether the liquid crystal in the cholesteric liquid crystal layer is in the planar texture state according to the spectrum.

17. A pressure detecting method, wherein the pressure detecting method is based on a pressure sensor, the pressure sensor comprises a liquid crystal cell comprising a first substrate and a second substrate which are opposite to each other, a cholesteric liquid crystal layer between the first substrate and the second substrate, a horizontally-oriented alignment layer between the cholesteric liquid crystal layer and the first substrate, and another horizontally-oriented alignment layer between the cholesteric liquid crystal layer and the second substrate; a liquid crystal state detector module and a pressure finder module, and the liquid crystal cell comprises a pressure receiving surface;
the pressure detecting method comprises:
by the liquid crystal state detector module, detecting a liquid crystal arrangement state in the cholesteric liquid crystal layer in a situation where a pressure is applied on the pressure receiving surface of the liquid crystal cell;
by the pressure finder module, finding a value of the pressure corresponding to the liquid crystal arrangement state from a pre-stored correspondence table.

18. The pressure detecting method according to claim 17, wherein
the liquid crystal state detector module comprises a light transmittance detector unit, and the pressure finder module comprises a first finder unit;
the detecting the liquid crystal arrangement state in the cholesteric liquid crystal layer comprises:
by the light transmittance detector unit, detecting a light transmittance of the cholesteric liquid crystal layer, wherein the light transmittance that is detected represents the liquid crystal arrangement state in the cholesteric liquid crystal layer;
the finding the value of the pressure corresponding to the liquid crystal arrangement state comprises:
by the first finder unit, finding the pressure corresponding to the light transmittance from a first correspondence table, wherein the first correspondence table stores different light transmittances and pressure values corresponding to the light transmittances.

19. The pressure detecting method according to claim 17, wherein
the liquid crystal state detector module comprises a spectrum detector unit, and the pressure finder module comprises a second finder unit;
the detecting the liquid crystal arrangement state in the cholesteric liquid crystal layer comprises:
by the spectrum detector unit, detecting a spectrum of light reflected by the cholesteric liquid crystal layer, wherein the spectrum that is detected represents the liquid crystal arrangement state in the cholesteric liquid crystal layer;
the finding the value of the pressure corresponding to the liquid crystal arrangement state comprises:
using the second finder unit to find the pressure corresponding to the spectrum from a second correspondence table, wherein the second correspondence table stores different spectrums and pressure values corresponding to the spectrums.

20. The pressure detecting method according to claim 17, wherein
the liquid crystal cell comprises a first substrate and a second substrate which are opposite to each other, the cholesteric liquid crystal layer is between the first substrate and the second substrate, a horizontally-oriented alignment layer is between the cholesteric liquid crystal layer and the first substrate, and another horizontally-oriented alignment layer is between the cholesteric liquid crystal layer and the second substrate; one of the first substrate and the second substrate is provided with a reference electrode, the other one of the first substrate and the second substrate is provided with a driving electrode, and the reference electrode is loaded with a constant reference voltage; the liquid crystal state detector module comprises a first driving voltage output unit, a first liquid crystal state determiner unit and a first output controller unit, the first driving voltage output unit is connected with the driving electrode, the first output controller unit is connected with the first driving voltage output unit and the first liquid crystal state determiner unit; the pressure finder module comprises a third finder unit;

the detecting the liquid crystal arrangement state in the cholesteric liquid crystal layer comprises:

by the first driving voltage output unit, outputting a first driving voltage to the driving electrode, wherein a value of the first driving voltage gradually increases from a value of the reference voltage;

by the first liquid crystal state determiner unit, determining whether the liquid crystal in the cholesteric liquid crystal layer is in a homeotropic texture state;

upon the first liquid crystal determiner unit determines that the liquid crystal in the cholesteric liquid crystal layer is in the homeotropic texture state, by the first output controller unit, recording the first driving voltage that is output by the first driving voltage output unit, and then controlling the first driving voltage output unit to output the reference voltage;

the finding the value of the pressure corresponding to the liquid crystal arrangement state comprises:

by the third finder unit, finding the pressure corresponding to the first driving voltage recorded by the first output controller unit from a third correspondence table, wherein the third correspondence table stores different first driving voltages and pressure values corresponding to the first driving voltages.

* * * * *

UNITED STATES PATENT AND TRADEMARK OFFICE
CERTIFICATE OF CORRECTION

PATENT NO. : 11,320,678 B2  
APPLICATION NO. : 16/329506  
DATED : May 3, 2022  
INVENTOR(S) : Ying Wang et al.

It is certified that error appears in the above-identified patent and that said Letters Patent is hereby corrected as shown below:

On the Title Page

Item (71) Applicants should read: BEIJING BOE OPTOELECTRONICS TECHNOLOGY CO., LTD., Beijing (CN); BOE TECHNOLOGY GROUP CO., LTD., Beijing (CN)

Signed and Sealed this  
Twenty-fourth Day of January, 2023

Katherine Kelly Vidal  
*Director of the United States Patent and Trademark Office*